US009513482B2

(12) United States Patent
Abdollahi et al.

(10) Patent No.: US 9,513,482 B2
(45) Date of Patent: Dec. 6, 2016

(54) HEADS UP DISPLAY SYSTEMS FOR GLASSES

(71) Applicant: Intel Corporation, Santa Clara, CA (US)

(72) Inventors: Hamid Abdollahi, Vancouver (CA); Raymond C. M. Leung, Vancouver (CA)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 14/407,425

(22) PCT Filed: Jun. 10, 2013

(86) PCT No.: PCT/CA2013/050440
§ 371 (c)(1),
(2) Date: Dec. 11, 2014

(87) PCT Pub. No.: WO2013/185224
PCT Pub. Date: Dec. 19, 2013

(65) Prior Publication Data
US 2015/0177521 A1 Jun. 25, 2015

Related U.S. Application Data

(60) Provisional application No. 61/799,466, filed on Mar. 15, 2013, provisional application No. 61/658,731, filed on Jun. 12, 2012.

(51) Int. Cl.
G02B 27/01 (2006.01)
G02C 11/00 (2006.01)
G02C 9/00 (2006.01)

(52) U.S. Cl.
CPC ......... *G02B 27/0176* (2013.01); *G02B 27/017* (2013.01); *G02B 27/0172* (2013.01);
(Continued)

(58) Field of Classification Search
CPC combination set(s) only.
See application file for complete search history.

(56) References Cited

U.S. PATENT DOCUMENTS 4,753,514 A 6/1988 Kubik
D338,514 S 8/1993 Holmes
(Continued)

FOREIGN PATENT DOCUMENTS

JP 2000112396 4/2000
WO 2011044680 A1 4/2011
WO 2011085501 A1 7/2011

OTHER PUBLICATIONS

International Search Report and Written Opinion dated Sep. 16, 2013 issued against corresponding PCT Application No. PCT/CA2013/050440.
(Continued)

*Primary Examiner* — Dwayne Bost
*Assistant Examiner* — Robert Michaud
(74) *Attorney, Agent, or Firm* — Patent Capital Group

(57) ABSTRACT

A Heads-Up Display (HUD) system for mounting on a pair of glasses comprises a power module for providing electrical power removably mountable to one side of a lens assembly of the glasses, an electronics module connectable to receive electrical power from the power module, the electronics module removably mountable to an opposite side of the lens assembly of the glasses; and a display housing mounted on a display arm extending from the electronics module to a position within a field of vision of a user wearing the glasses. A pair of glasses adapted to receive a HUD system comprises a lens assembly providing one or more electrically conductive paths from a first side thereof to a second side thereof.

21 Claims, 18 Drawing Sheets

(52) U.S. Cl.
CPC ........... *G02B 27/0179* (2013.01); *G02C 9/00* (2013.01); *G02C 11/10* (2013.01); *G02B 2027/0178* (2013.01)

(56) References Cited

U.S. PATENT DOCUMENTS

| | | | |
|---|---|---|---|
| 5,486,841 A | 1/1996 | Hara et al. | |
| D370,909 S | 6/1996 | Oikawa et al. | |
| D380,482 S | 7/1997 | Shimasaki et al. | |
| D439,265 S | 3/2001 | Hayashi | |
| 6,204,974 B1 * | 3/2001 | Spitzer | G02B 27/017 359/630 |
| D444,155 S | 6/2001 | Morooka et al. | |
| 6,349,001 B1 * | 2/2002 | Spitzer | G02B 27/017 345/8 |
| D517,066 S | 3/2006 | Travers et al. | |
| D537,078 S | 2/2007 | Tanaka et al. | |
| D559,250 S | 1/2008 | Pombo | |
| D571,366 S | 6/2008 | Lee et al. | |
| D579,014 S | 10/2008 | Travers et al. | |
| D609,236 S | 2/2010 | Matsumoto et al. | |
| D640,256 S | 6/2011 | So | |
| D645,862 S | 9/2011 | Paul | |
| D659,136 S | 5/2012 | Matsumoto | |
| D659,137 S | 5/2012 | Matsumoto | |
| D667,483 S | 9/2012 | Krsmanovic | |
| D669,471 S | 10/2012 | Hwang et al. | |
| D680,152 S | 4/2013 | Olsson et al. | |
| D682,267 S | 5/2013 | Mase | |
| D682,268 S | 5/2013 | Ricks et al. | |
| D685,019 S | 6/2013 | Li | |
| D697,130 S | 1/2014 | Lovgren | |
| D701,557 S | 3/2014 | Lee et al. | |
| D704,705 S | 5/2014 | Mehin et al. | |
| D706,780 S | 6/2014 | Abdollahi et al. | |
| 2008/0169998 A1 | 7/2008 | Jacobsen et al. | |
| 2010/0026970 A1 | 2/2010 | Tanaka | |
| 2010/0045928 A1 * | 2/2010 | Levy | H04M 1/05 351/158 |
| 2011/0232945 A1 * | 9/2011 | Whitcomb | C03C 17/007 174/254 |
| 2011/0304814 A1 * | 12/2011 | Wong | G02C 5/2254 351/153 |
| 2012/0105740 A1 * | 5/2012 | Jannard | G02C 9/04 348/794 |
| 2012/0235902 A1 * | 9/2012 | Eisenhardt | A42B 3/042 345/156 |
| 2013/0249776 A1 * | 9/2013 | Olsson | G06F 1/163 345/8 |

OTHER PUBLICATIONS

"MOD Live User Manual", Dec. 6, 2011, pp. 1-80, XP055242553, Retrieved from the Internet: URL:http://www.gpscentral.ca/manuals/MOD_live_user_manual_1_1.pdf; retrieved Jan. 19, 2016.
European Search Report for Application No. 13804697.4 issued Jan. 16, 2016.

* cited by examiner

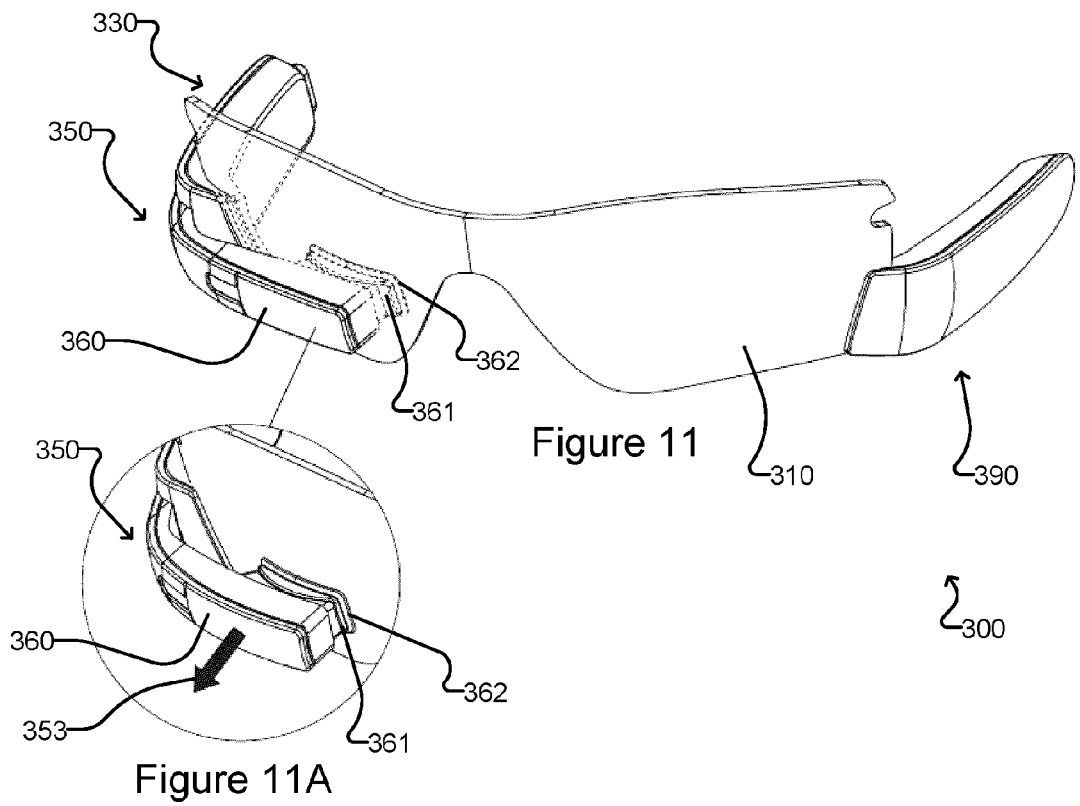
Figure 11
Figure 11A
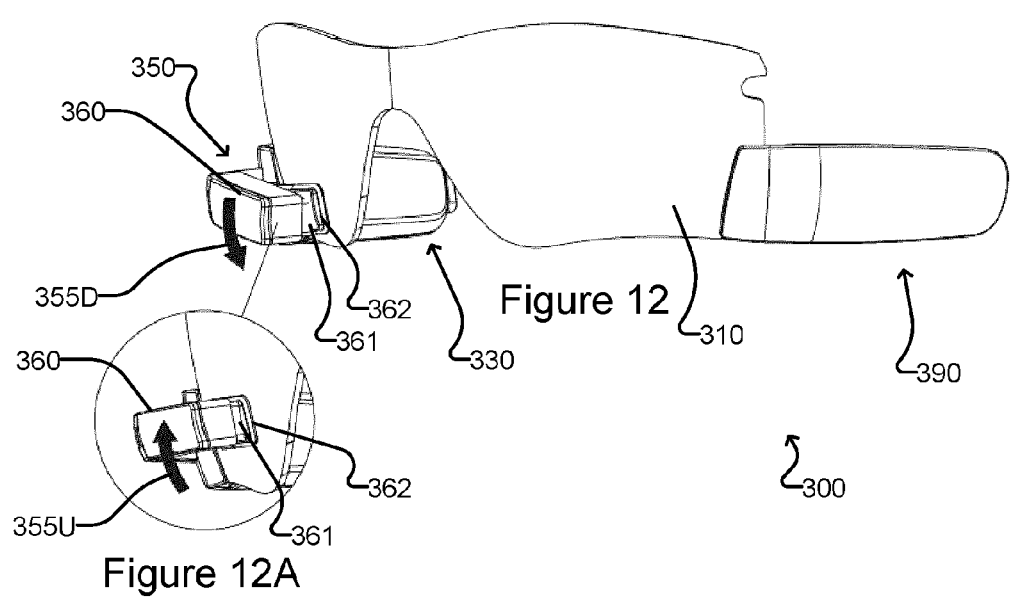
Figure 12
Figure 12A

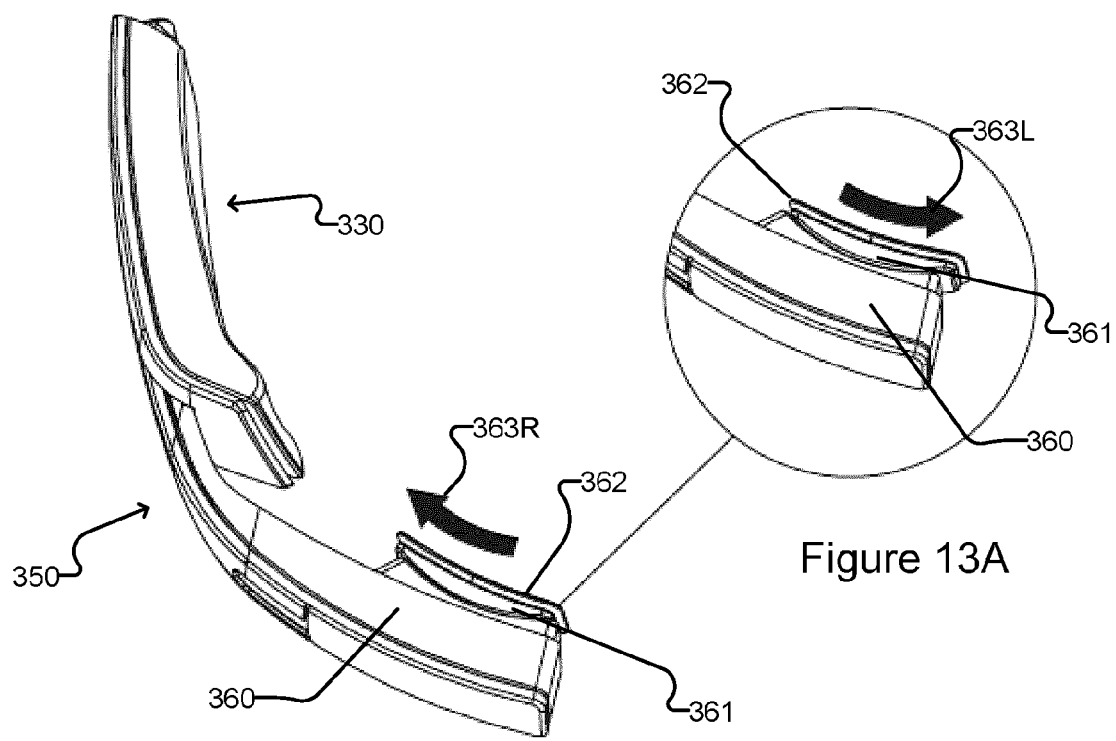
Figure 13
Figure 13A
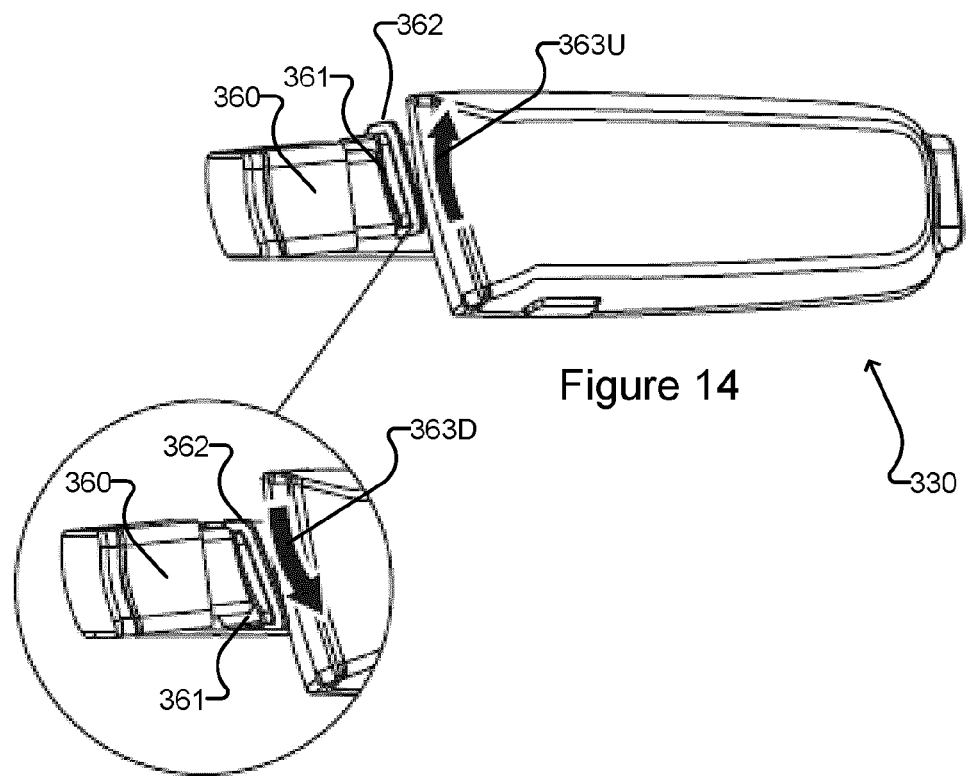
Figure 14
Figure 14A

HEADS UP DISPLAY SYSTEMS FOR GLASSES

CROSS REFERENCE TO RELATED APPLICATIONS

This application claims priority from U.S. Provisional Patent Application No. 61/658,731 filed Jun. 12, 2012 and U.S. Provisional Patent Application No. 61/799,466 filed on Mar. 15, 2013, both of which are entitled HEADS UP DISPLAY SYSTEMS FOR GLASSES. For purposes of the United States of America, this application claims the benefit under 35 U.S.C. §119 of U.S. Provisional Patent Application Nos. 61/658,731 filed Jun. 12, 2012 and 61/799,466 filed Mar. 15, 2013, both of which are hereby incorporated herein by reference for all purposes.

FIELD

The present disclosure relates generally to heads up displays. More particularly, the present disclosure relates to heads up display systems for glasses, and glasses adapted for such systems.

BACKGROUND

Athletes and others engaged in physical activity are sometimes unable to safely use their hands to operate electronic devices and/or take their view away from the focus of their physical activity for very long.

The inventors have determined a need for improved heads up display systems for glasses.

SUMMARY

One aspect provides a Heads-Up Display (HUD) system for a pair of glasses comprising a lens assembly having a first side and a second side opposite the first side, a power module mounted to the first side of the lens assembly, an electronics module mounted to the second side of the lens assembly, and, a display mounted on a display arm extending from the electronics module to a position within a field of vision of a user wearing the glasses.

Another aspect provides a HUD system for mounting on a pair of glasses, the HUD system comprising a power module for providing electrical power removably mountable to one side of a lens assembly of the glasses, an electronics module connectable to receive electrical power from the power module, the electronics module removably mountable to an opposite side of the lens assembly of the glasses; and a display mounted on a display arm extending from the electronics module to a position within a field of vision of a user wearing the glasses.

Another aspect provides a pair of glasses adapted to receive a Heads-Up Display (HUD) system, the glasses comprising a lens assembly providing one or more electrically conductive paths from a first side thereof to a second side thereof.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 11 shows an example pair of glasses with a HUD system according to one embodiment.

FIG. 11A shows a portion of the glasses and HUD system of FIG. 11.

FIGS. 12 and 12A illustrate adjustability of the display housing of the HUD system of FIG. 11 according to one embodiment.

FIGS. 13 and 13A illustrate lateral adjustability of the display unit with respect to the display housing of the HUD system of FIG. 11 according to one embodiment.

FIGS. 14 and 14A illustrate vertical adjustability of the display unit with respect to the display housing of the HUD system of FIG. 11 according to one embodiment.

DETAILED DESCRIPTION

Generally, the present disclosure provides heads up display systems, methods and related apparatus configured for mounting on glasses. Example embodiments are described herein in the context of mounting to the lenses of sunglasses, but it is to be understood that other embodiments may be mounted to other types of glasses.

Figure 1:
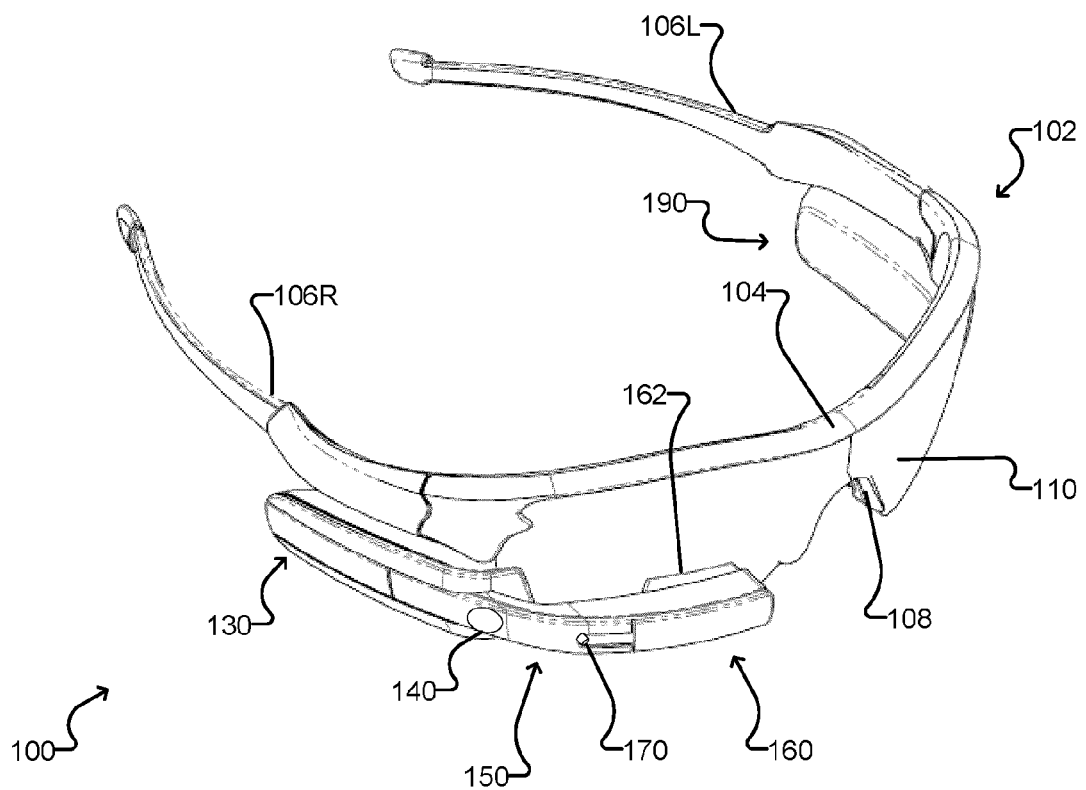
FIG. 1 shows an example pair of glasses with a heads up display (HUD) system according to one embodiment.
Figure 1A:
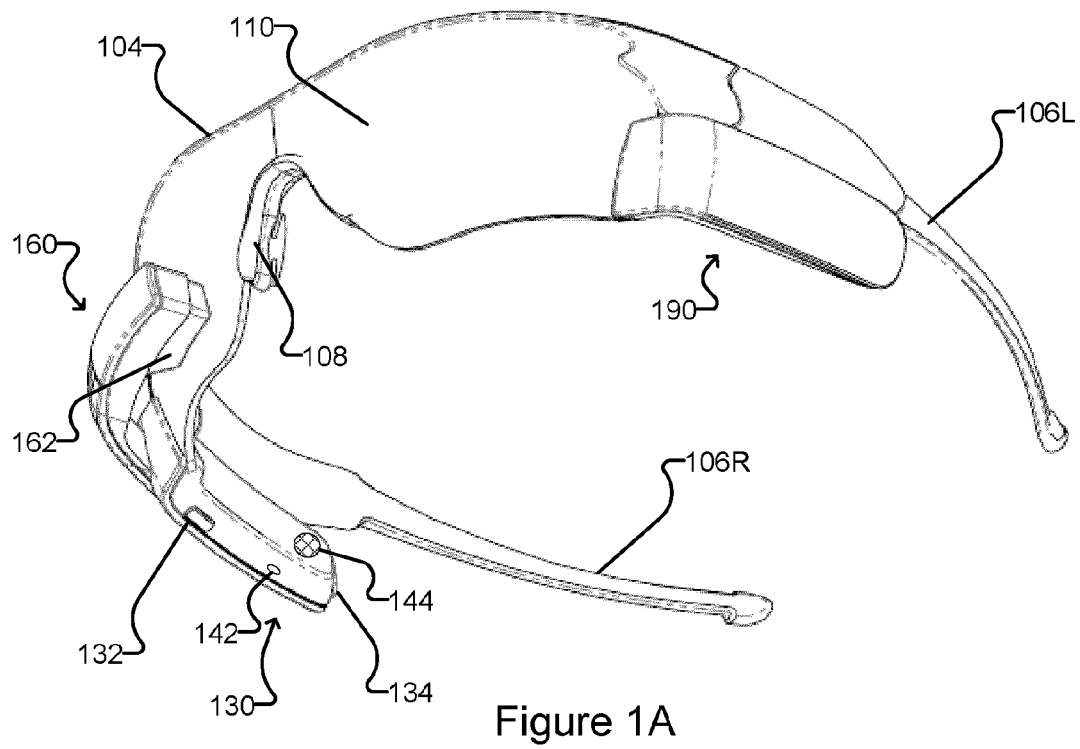
FIG. 1A is a bottom perspective view of the glasses and HUD system of FIG. 1.

FIGS. 1 and 1A show an example heads up display (HUD) system 100 mounted on a pair of glasses according to one embodiment. In the illustrated embodiment, the glasses comprise a frame 102 having a cross piece 104 and a pair of temple pieces 106L and 106R. A lens assembly 110 is coupled to cross piece 104. A nose piece 108 is coupled to the bottom portion of lens assembly 110. System 100 comprises an electronics module 130 and a power module 190 mounted on opposite sides of lens assembly 110. Electronics module 130 houses a processor and a variety of other components as described below for controlling the operation of system 100. Power module 190 houses a battery or other power source, and optionally power conditioning circuit elements, for providing electrical power to the various components of system 100. A power button 132 is provided for powering electronics module on and off. A communication port 134 (such as, for example, a mini USB port) is provided for connecting electronics module 130 to other devices. In the illustrated embodiment, electronics module 130 is shown coupled to the right side of lens assembly 110 and power module 190 is shown coupled to the left side of lens assembly 110, but the positions of electronics module 130 and a power module 190 may be reversed in other embodiments.

A display arm 150 extends forwardly and inwardly from electronics module 130 to position a display housing 160 within the field of vision of a user wearing the glasses. Display housing 160 houses a display unit for displaying images to the user as described below. Display arm 150 is preferably adjustable to provide the user with one or more degrees of freedom to adjust the position of display housing 160. A viewing hood 162 may be provided on display housing 160. Viewing hood 162 may be positioned against lens assembly 210. Viewing hood 162 reduces the amount of ambient light which could interfere with the user's viewing of images on the display. In some embodiments, display housing 160 and/or viewing hood 162 is constructed from an ultraviolet (UV)-blocking material, such as for example a UV-blocking plastic resin, as known in the art. Such embodiments may be particularly advantageous for use with lens assemblies having tinting or other properties which change with exposure to UV radiation (such as, for example, Transitions™ lenses or the like), such that the portion of the lens assembly between the display and the user's eye will not be affected UV exposure, resulting in better transmission and higher brightness/contrast quality of the image when viewed by the user.

In some embodiments, the combined weight of electronics module 130, display arm 150 and display housing 160 (as well as any other components attached thereto) may be selected to be approximately equal to the weight of power module 190, such that the glasses remain balanced when electronics module 130 and power module 190 are attached to lens assembly 110.

A user interface control 140 may be provided for interacting with system 100. User interface control 140 may be located on display arm 150 as in the illustrated example, on electronics module 130, or at any other convenient location. User interface control 140 may comprise, for example a directional touch pad for navigating menus of a virtual user interface displayed to the user. User interface control 140 may also be operably coupled to an optional camera 170 (either directly to a camera driver circuit, or indirectly through, for example, the processor in electronics module 130), and configured such that a user may take a picture with camera 170 by clicking inward on user interface control 140.

In some embodiments, a microphone 142 for receiving voice commands and other audio information and a speaker 144 for playing sounds to the user (e.g., audio cues) may be provided. Microphone 142 and speaker 144 may be located on electronics module 130 as in the illustrated example, on display arm 150, or at any other convenient location.

Figure 2:
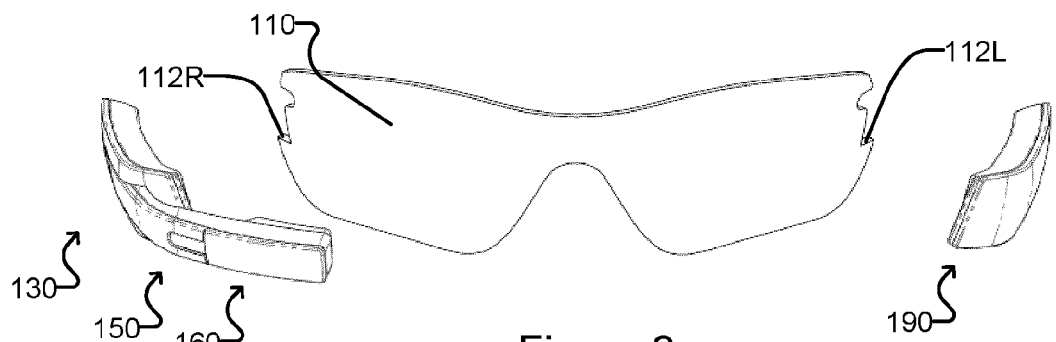
FIG. 2 is an exploded view of the lens assembly of the glasses and the HUD system of FIG. 1.

FIG. 2 shows lens assembly 110 in isolation without the other components of the glasses, with electronics module 130 (with display arm 150 and display housing 160) and power module 190 on opposite sides thereof. As described further below, electronics module 130 and power module 190 comprise lens engagement features configured to engage left and right side portions 112R and 112L of lens assembly 110. In some embodiments, the lens engagement features of electronics module 130 and power module 190 are configured such that electronics module 130 and power module 190 can rapidly and easily be attached to and removed from lens assembly 110 by a user, but are sufficiently strongly coupled to lens assembly 110 so as to stay in place while the user is engaged in physical activity. In some embodiments, the structure for coupling electronics module 130 and power module 190 to lens assembly 110 may be selected based on an expected impact level of the user's physical activity. In some embodiments, the lens engagement features of electronics module 130 and power module 190 are configured to form snap-fit connections with features of components of lens assembly 110. As used herein, the term "snap-fit" refers to any releasable connection which is formed at least in part by resilient deformation in one of the connecting components. Such resilient deformation may be relieved once the snap-fit connection is made.

Figure 2A:
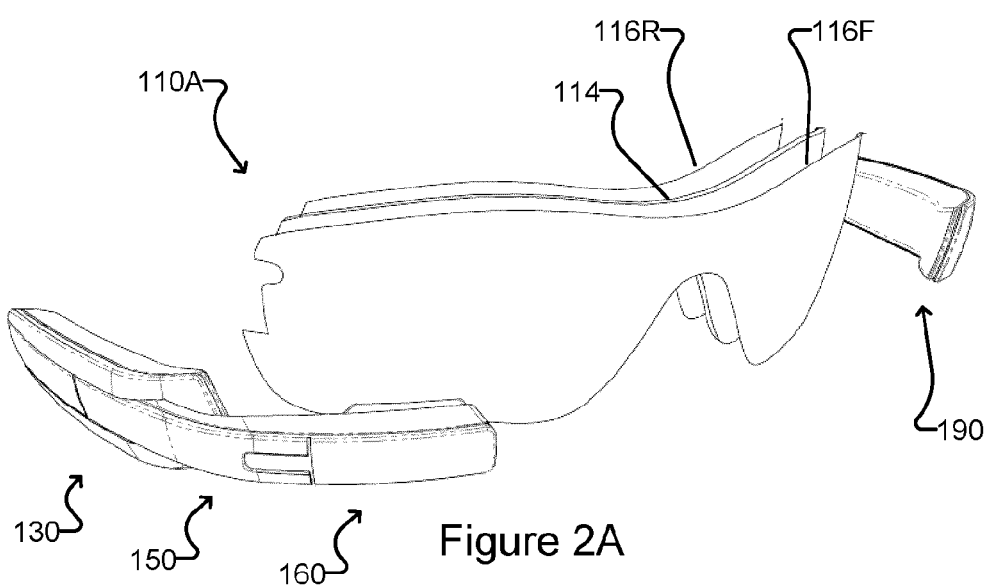
FIG. 2A illustrates components of a lens assembly according to one embodiment.
Figure 2B:
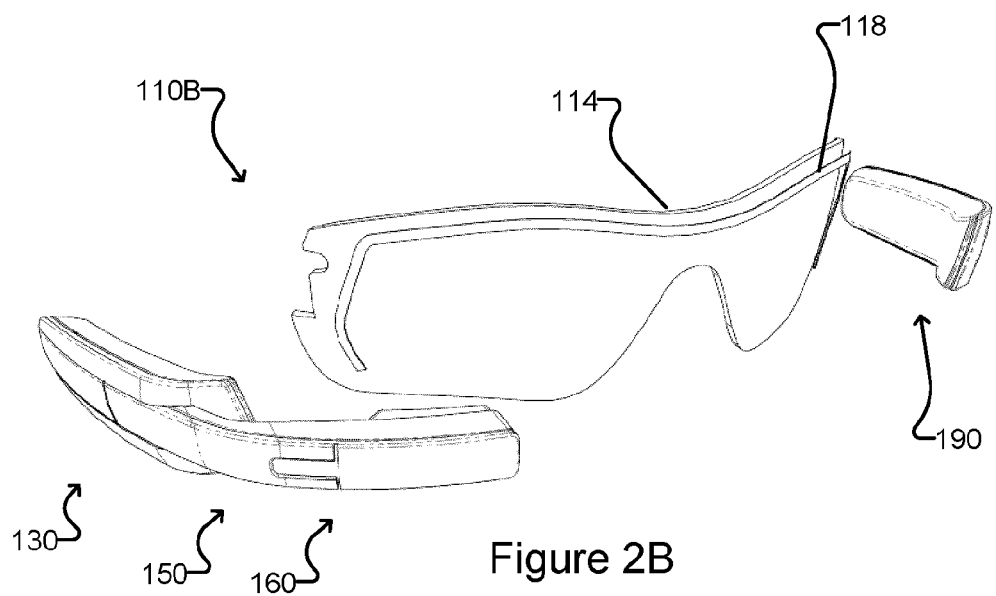
FIG. 2B illustrates components of a lens assembly according to another embodiment.

FIGS. 2A and 2B show exploded views of example lens assemblies 110A and 110B, respectively. Lens assemblies 110A and 110B each provide electrical connections between the sides thereof, such that contacts of electronics module 130 may be connected through lens assembly 110A or 110B to receive electrical power from contacts of power module 190 without requiring any additional electrical connections (such as, for example a cable running through cross piece 104).

Lens assembly 110A comprises a transparent lens 114 with transparent conductive films (TCFs) 116F and 116R applied to the front and rear sides thereof. In some embodiments, one or more additional layers may be provided atop either or both of TCFs 116F and 116R, such as, for example, insulation layers, protective coating layers, etc. TCFs 116F and 116R may, for example comprise transparent conductive oxides (e.g., indium tin oxide (ITO), fluoride doped tin oxide, doped zinc oxide, etc.), organic conductors (e.g., carbon nanotube networks, graphene and materials based thereon, including those described in Khrapach, I., Withers, F., Bointon, T. H., Polyushkin, D. K., Barnes, W. L., Russo, S. and Craciun, M. F. (2012), *Novel Highly Conductive and Transparent Graphene-Based Conductors*. Adv. Mater. doi: 10.1002/adma.201200489 which is hereby incorporated by reference herein, networks of polymers, etc.), metal layer and grids (e.g. printable conductive inks such as, for example, silver nanowire inks or other nanostructure inks) or other structures which conduct electricity while permitting visible light to pass therethrough. TCFs 116F and 116R may be applied to the front and rear sides of lens 114 by any of a variety of suitable techniques known in the art.

Lens assembly 110B comprises a flexible printed circuit (FPC) cable 118 extending between the sides of lens 114 to provide conductive paths. FPC cable 118 may or may not be transparent, and when not transparent may be routed around the periphery of lens 114 as shown in FIG. 2B. As an alternative to cable 118, lens assembly 110B could have conductive paths formed by one or more printable conductive inks.

Figure 3:
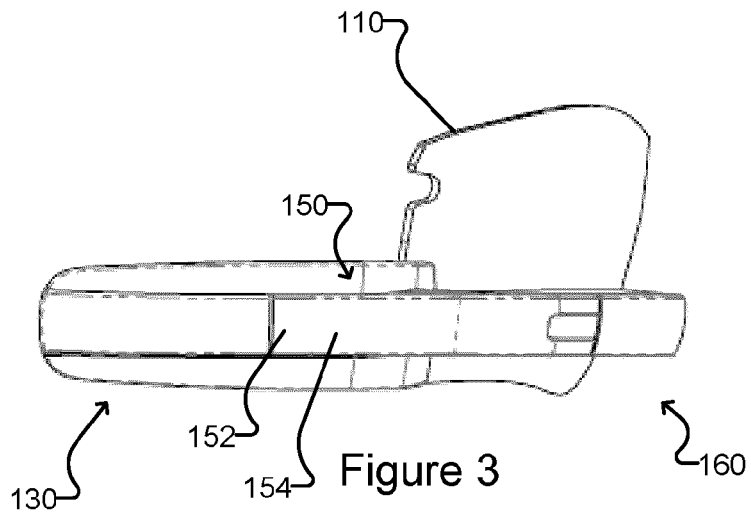
FIGS. 3, 3A and 3B are side views of the lens assembly of the glasses and the HUD system of FIG. 1 illustrating movement of the display arm in first and second degrees of freedom.
Figure 3A:
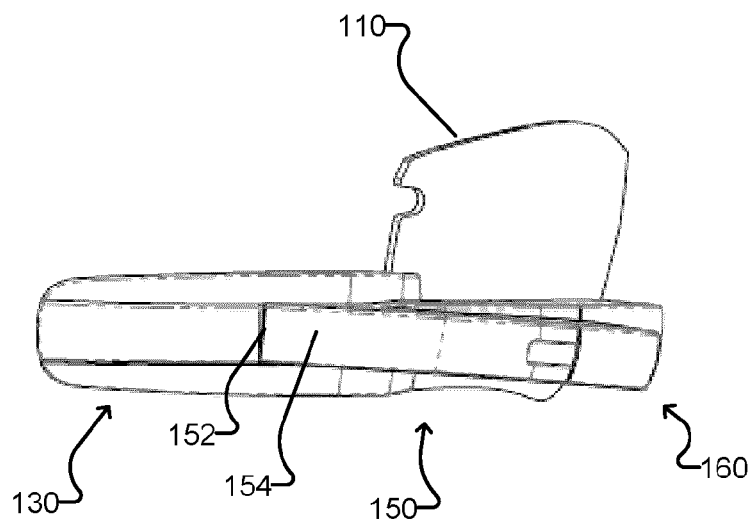
Figure 3B:
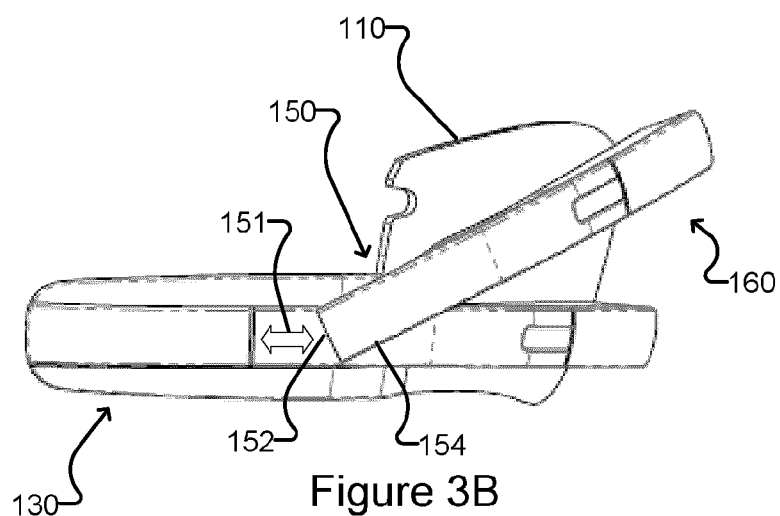
Figure 4:
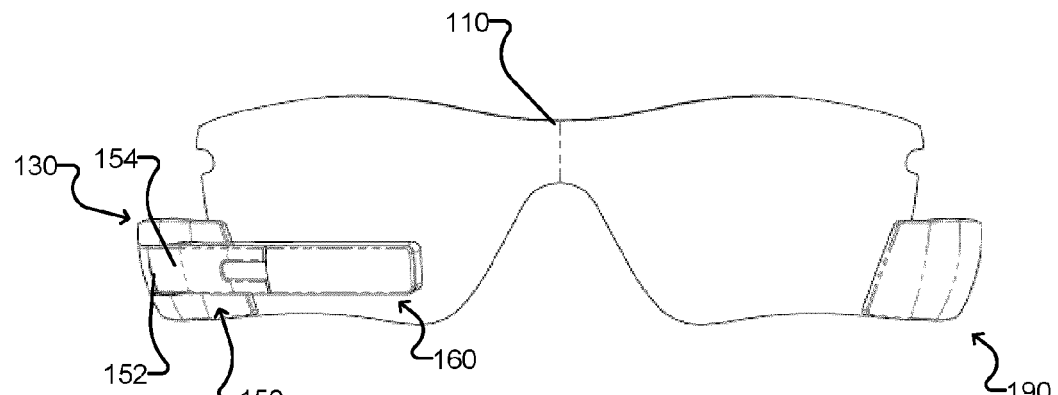
FIGS. 4, 4A and 4B are front views of the lens assembly of the glasses and the HUD system of FIG. 1 illustrating movement of the display arm in first and second degrees of freedom.
Figure 4A:
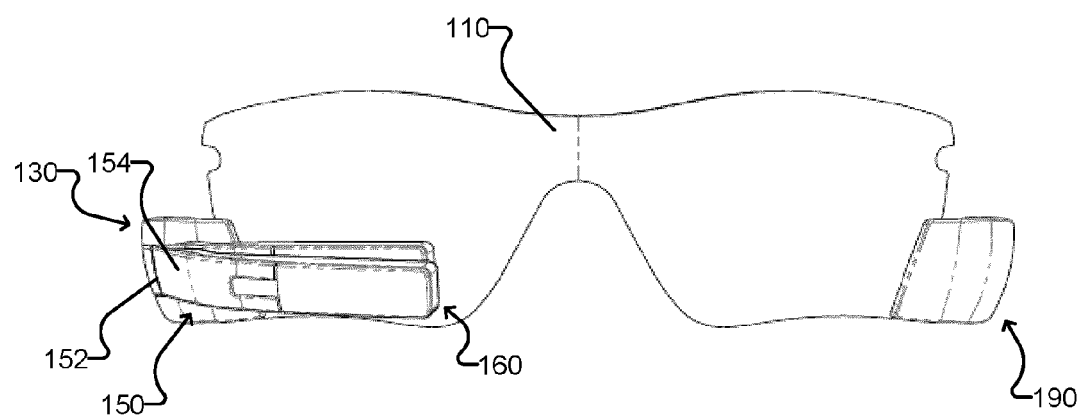
Figure 4B:
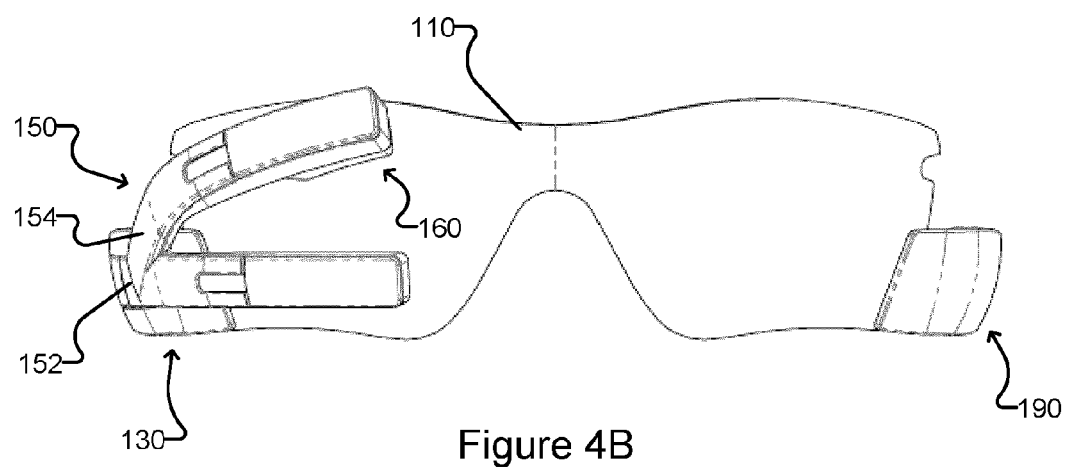

FIGS. 3, 3A and 3B are side views and FIGS. 4, 4A and 4B are front views illustrating adjustability of display arm 150 in first and second degrees of freedom according to one embodiment. Display arm 150 comprises a first joint 152 pivotally connecting a first segment 154 of display arm 150 to electronics module 130. First joint 152 permits display arm 150 (and thus display housing 160) to be moved between a lowered position as shown in FIGS. 3A and 4A and a raised position as shown in FIGS. 3B and 4B. First joint 152 may also be slidably coupled to electronics module 130 to permit first segment 154 to move forward and backward relative to electronics module 130 as indicated by double headed arrow 151.

Figure 5:
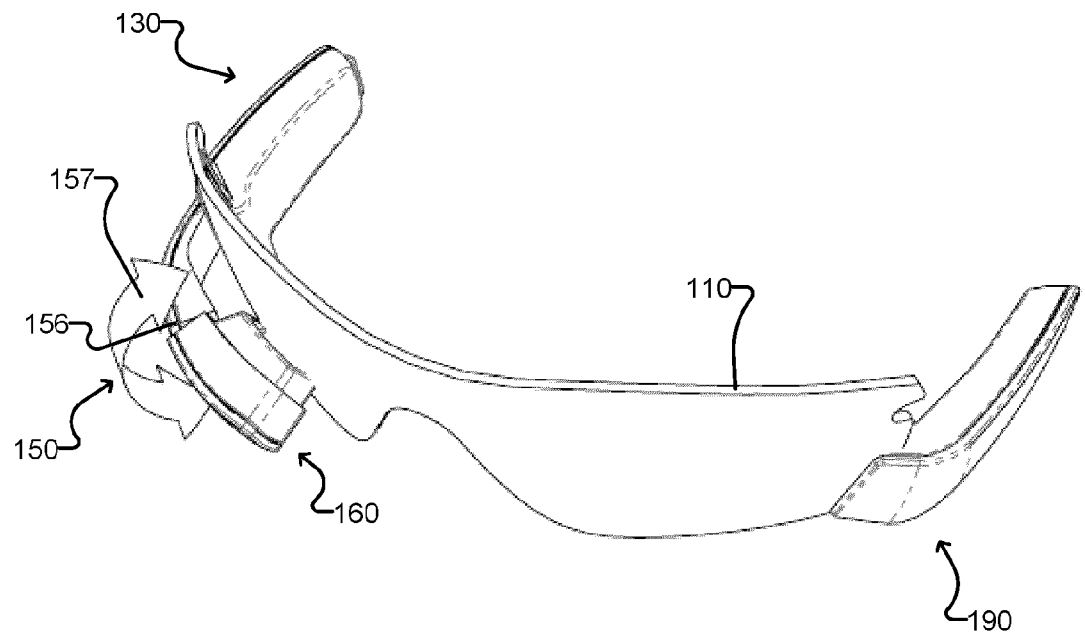
FIGS. 5 and 5A are respectively top perspective and side views of the lens assembly of the glasses and the HUD system of FIG. 1 illustrating movement of the display arm in a third degree of freedom.
Figure 5A:
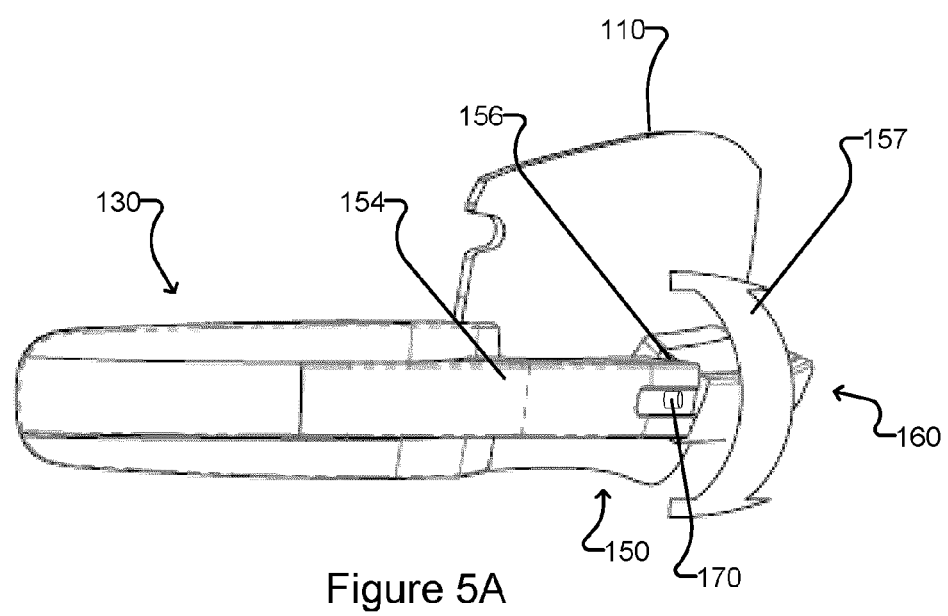

FIGS. 5 and 5A illustrate adjustability of display arm 150 in a third degree of freedom according to one embodiment. A second joint 156 pivotally connects display housing 160 to first segment 154 of display arm 150. Second joint 156 permits the angle of display housing 160 to be adjusted as indicated by double headed arrow 157 to allow the user to change the viewing angle of the display. In embodiments which include camera 170, camera 170 may be positioned on first segment 154 in some embodiments such that the angle of camera 170 is not dependent on the angle of display housing 160.

Figure 6:
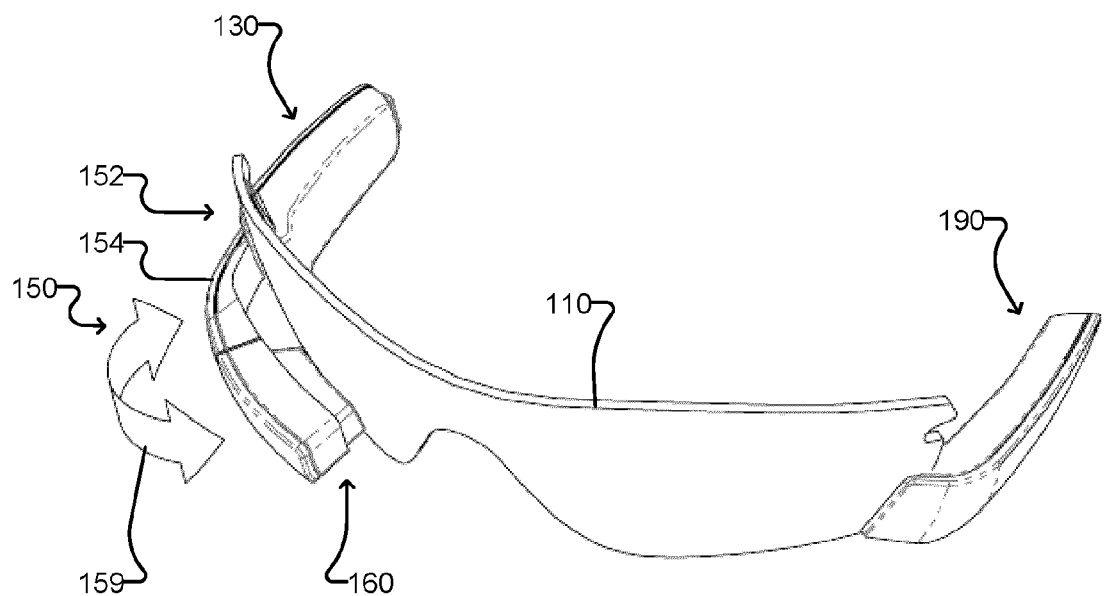
FIGS. 6 and 6A are respectively top perspective and side views of the lens assembly of the glasses and the HUD system of FIG. 1 illustrating movement of the display arm in a fourth degree of freedom.
Figure 6A:
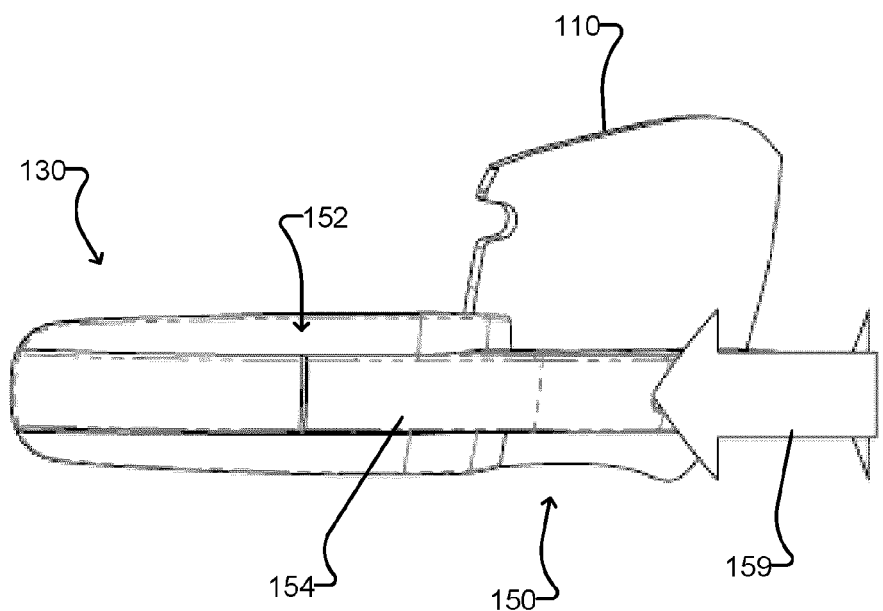

FIGS. 6 and 6A illustrate adjustability of display arm 150 in a fourth degree of freedom according to one embodiment. In the embodiment of FIGS. 6 and 6A, first joint 152 also permits display arm 150 (and thus display housing 160) to be pivoted inwardly and outwardly relative to lens assembly 110 as indicated by double headed arrow 159.

Figure 7:
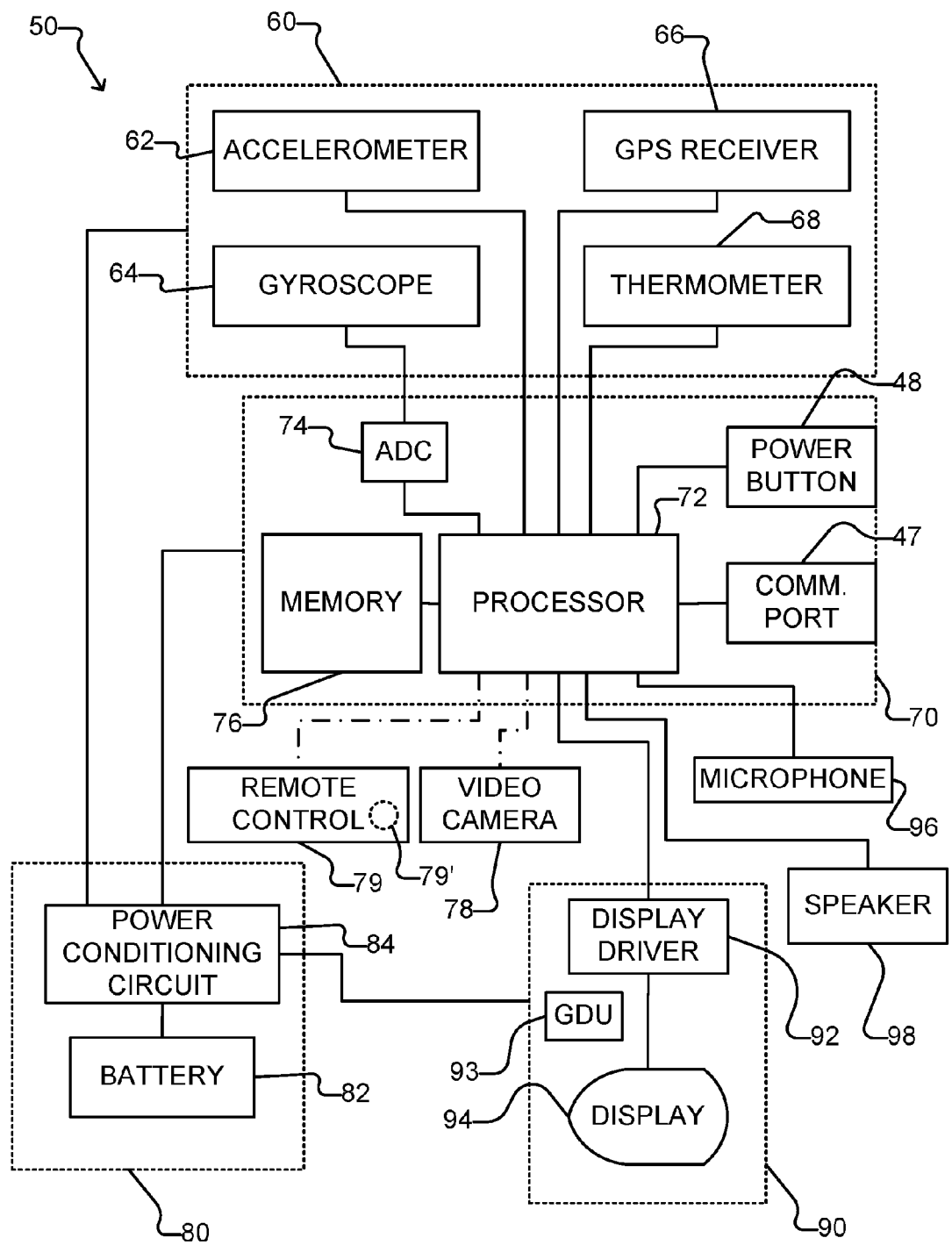
FIG. 7 is a schematic diagram of an electronic system of a HUD system according to an example embodiment.

FIG. 7 shows an example embodiment of an electronic system 50 suitable for use with a modular HUD system as described herein. Electronic system 50 comprises sensor unit 60, processor unit 70, power unit 80 and display unit 90. With reference to the example HUD system 100 described above, sensor unit 60 and processor unit 70 may be substantially contained in electronics module 130, power unit 80 may be substantially contained in power module 190 and display unit 90 may be substantially contained in display housing 160.

In the illustrated embodiment, sensor unit 60 comprises a 3-axis accelerometer 62, a 3-axis gyroscope 64, a GPS receiver 66, and a thermometer 68. Accelerometer 62 and gyroscope 64 are collectively referred to herein as "INS" (inertial navigation system) sensors. The INS sensors 62, 64 and GPS receiver 66 have complementary strengths and weaknesses such that their combined use provides for improved reliability and accuracy of measurement of position and altitude as compared to each sensor on its own.

Accelerometer 62 may comprise, for example, a micro-electro-mechanical system (MEMS) device which produces digital output signals representative of linear accelerations along three perpendicular axes. In some embodiments, accelerometer 62 may comprise a LIS331DL motion sensor manufactured by STMicroelectronics.

Gyroscope 64 may comprise, for example, two MEMS devices, one of which produces analog output signals representative of angular velocities about two perpendicular axes, and one of which produces an analog output signal about a third axis perpendicular to the other two axes. In some embodiments, gyroscope 64 may comprise an IDG-500 for measuring angular velocities about an x-axis and a y-axis, and an ISZ-500 for measuring angular velocity about a z-axis, both of which are manufactured by InvenSense, Inc.

GPS receiver 66 may comprise, for example a Wide Area Augmentation System (WAAS) enabled GPS receiver with a built-in system clock. GPS receiver 66 may, for example, output digital signals using a protocol such as NMEA 0183 or NMEA 2000. Thermometer 68 may comprise, for example, a digital thermometer.

In other embodiments, sensor unit 60 may comprise one sensor, some combination of sensors described above or other sensors such as 3G signal receivers, wireless internet receivers, audio radio receivers, television or video receivers or the like.

Processor unit 70 comprises a processor 72 which, in the illustrated embodiment, is connected to receive signals from accelerometer 62, gyroscope 64, GPS receiver 66 and thermometer 68 of sensor unit 60. Processor unit 70 may comprise an analog-to-digital converter (ADC) 74 connected between processor 72 and any of the sensors of sensor unit 60 which produce analog signals. In the illustrated embodiment, all sensors of sensor unit 60 except gyroscope 64 have digital outputs, so ADC 64 is connected only between gyroscope 64 and processor 62.

In the illustrated embodiment, processor unit 70 also comprises a memory 76. Memory 76 may comprise volatile and/or non volatile memory such as RAM, ROM, or other types of memory. Memory 76 may also comprise a removable media such as a USB drive, SD or miniSD card, etc. Memory 76 has stored therein various computer readable instructions for use by processor 72. In other embodiments, memory 76 may be integrated into processor 72.

Processor 72 may also be coupled to communications port 47 and power button 48. Communications port 47 may be accessible to a user and comprise one or more interfaces for wired or wireless communication with external devices. Communications port 47 may, for example, comprise one or more USB, Firewire, or other interfaces. Power button 48 may also be accessible to the user and operable to turn electronic system 50 on and off.

Processor unit 70 may also send and receive information from other devices such as mobile phones, personal computers, other modular HUD systems, etc. For example, processor 72 may receive images or video from a video camera 78 (which may either be a camera coupled to the HUD system such as camera 170 above, or a separate camera) and send the same via an appropriate communications method. For example, in some embodiments processor 72 may control display 94 to act as a viewfinder for video camera 78 by displaying live images from video camera 78. Display of live images from camera 78 on display 94 may facilitate users capturing of intended scenes by providing feedback to users as to where camera 78 is pointing. Processor 72 may also cause display 94 to display stored images captured with video camera 78. Video camera 78 may be configured to capture both still and moving images in some embodiments. Video camera 78 may be physically connected to electronic system 50 or may be wirelessly connected through a Bluetooth communication protocol or other suitable communications methods. Processor 72 may also receive input commands from a remote control 79. Remote control 79 may be wirelessly connected to processor unit 70 and may comprise a wireless watch-type remote or be integrated into a user's gloves or mitts for example. Remote control 79 may also be integrated into video camera 78.

In some embodiments, remote control 79 may include a thermometer 79', and remote control 79 may be configured to transmit temperature readings taken by thermometer 79' to processor unit 70. Providing temperature readings taken by thermometer 79' in remote control 79 may provide for simplified temperature calibration in some embodiments, since remote control 79 may not be susceptible to as many thermal disturbances as thermometer 68 of sensor unit 60, which is typically located close to the users head and may be covered by a hat or other articles. Providing thermometer 79' in remote control 79 may thus improve the accuracy of temperature readings in some embodiments. In some embodiments, thermometer 79' may be used in conjunction with thermometer 68 of sensor unit 60. In some embodiments, thermometer 68 of sensor unit 60 may be omitted, and thermometer 79' may provide the only temperature readings to processor unit 70.

Processor 72 is configured to transform signals received from sensor unit 60 to produce outputs representing various parameters relating to user performance, and other outputs. For example, processor 72 may produce outputs relating to one or more of position, orientation, time, speed, direction of travel, altitude, vertical drop, jump airtime, jump distance, spins, etc. Processor 72 may store the outputs and/or any other data in memory 76. Processor 72 may also produce a video signal to be displayed by display unit 90. In some embodiments, the video signal produced by processor 72 for displaying on display 90 comprises one or more of:

an instantaneous speed indication;
an average speed indication;
a position indication;
an orientation indication;
a direction of travel indication;
an altitude indication;
a vertical drop indication;
a jump airtime indication;
a jump distance indication;
a jump rotation indication;
other motion indications;
live or stored images from a camera (such as camera 94 or another camera);
communication indications (e.g., text messages, emails, call indications, voicemail indications, etc.); and
other visual indications.

In this example embodiment, power unit 80 comprises a battery 82 and a power conditioning circuit 84. Power conditioning circuit 84 receives electrical power from battery 82 and outputs electrical power at voltages and/or currents suitable for the various components of sensor unit 60, processor unit 70, and display unit 90. In some embodiments, power conditioning circuit 84 may comprise temperature control elements and short circuit protection elements contained in power module 190. In some embodiments, power conditioning circuit 84 may comprise power management elements contained in power module 190.

Display unit 90 may comprise a display driver 92 to receive the video signal from processor 72. Display driver 92 is configured to generate driving signals based on the video signal, and to provide the driving signals to a display 94 as described above. In some embodiments, display driver 92 is contained in display housing 160. In some embodiments, display driver 92 may be directly connected or connectable to receive video signals from camera 78.

Display 94 may comprise, for example, a Quarter Video Graphics Array (QVGA) having a 320×240 resolution and 16 bit colors. In some embodiments, display 94 may comprise, a micro LCD illuminated by a suitable backlight. In other embodiments, other types of displays may be used, such as, for example, LED or OLED displays, electroluminescent (EL) displays, or the like. In some embodiments, a projector may be configured to project information to be displayed onto the lens. The projector may, for example, be positioned to project information to be displayed onto a portion of the lens near the edge of the user's field of view.

Display unit 90 may also comprise a glance detection unit 93 in some embodiments. Glance detection unit 93 is configured to detect when a user looks at display 94. Glance detection unit 93 may be operatively coupled to display driver 92 and configured to provide a signal to display driver 92 indicative of whether or not the user is looking at display 94, and display driver 92 may be configured to maintain display 94 in an off state or a power saving state unless the user is looking at display 94. In some embodiments, glance detection unit 93 may comprise an infrared transmitter and an infrared receiver operatively coupled to processing elements. The infrared transmitter emits infrared light which reflects off of a user's eye and is received by the infrared receiver. Through appropriate calibration, the processing elements of glance detection unit 93 may determine from the reflected infrared light received at the infrared receiver whether or not the user is looking at display 94. In other embodiments, glance detection unit 93 may comprise one or more brightness sensors configured to capture ambient light reflecting off of a user's eye to determine whether or not the user is looking at display 94. Further details of example glance detection units are described in U.S. patent application Ser. No. 13/781,386, which is hereby incorporated by reference herein.

A microphone 96 and speaker 98 may also optionally be operably coupled to processor 70 in some embodiments. As discussed above, with reference to FIGS. 1 and 1A, microphone 96 and speaker 98 may be located on electronics module 130, on display arm 150, or at any other convenient location.

Figure 8:
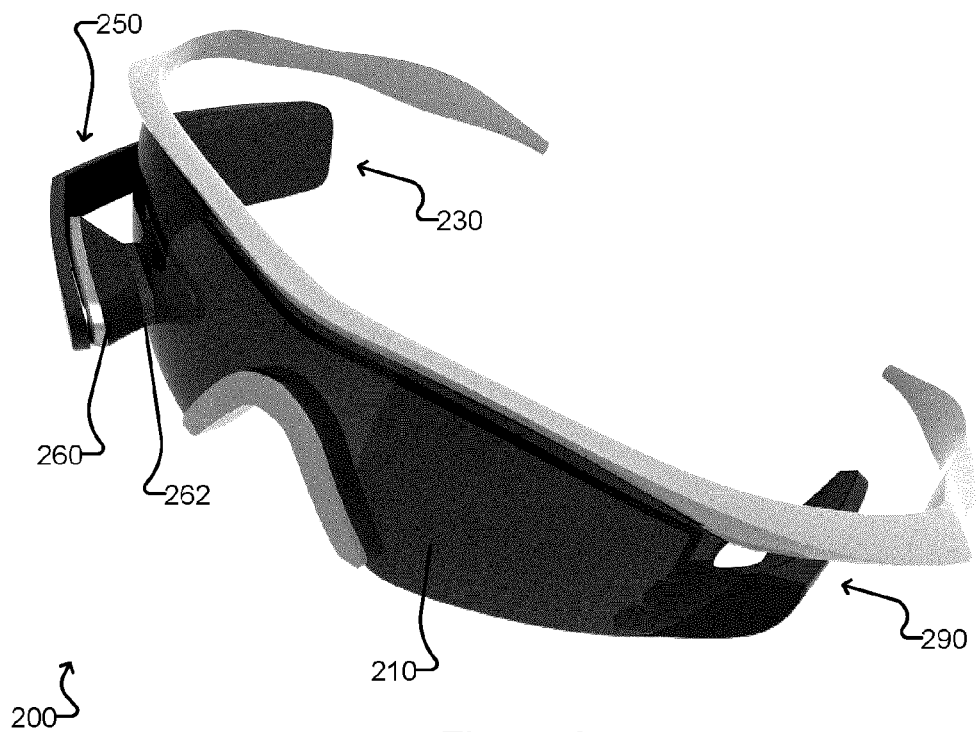
FIG. 8 shows an example pair of glasses with a HUD system according to another embodiment.
Figure 9:
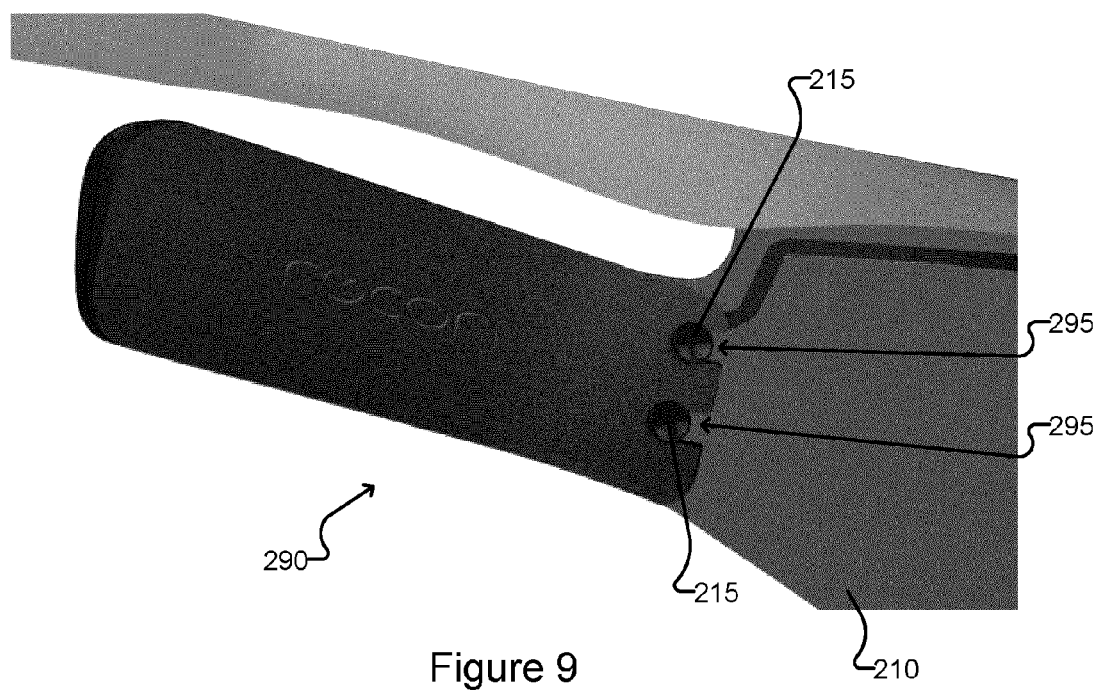
FIG. 9 shows example lens engagement features according to one embodiment.
Figure 10:
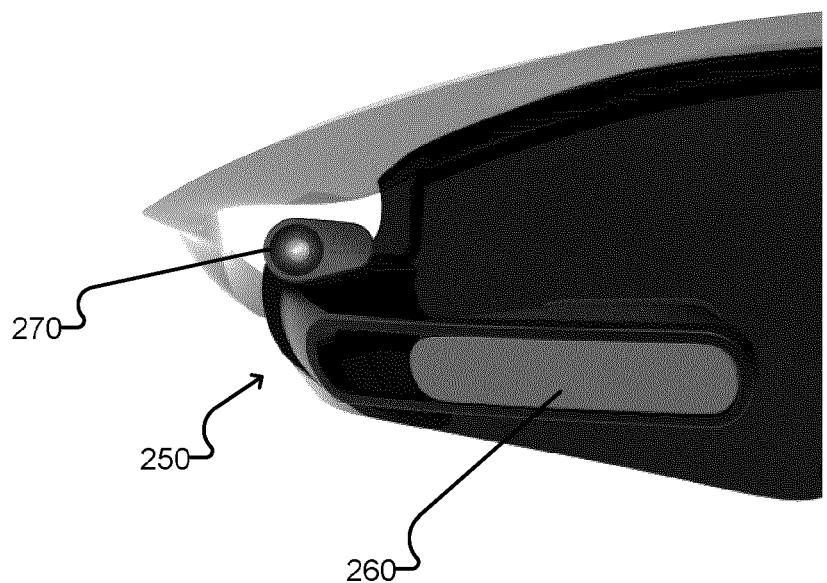
FIG. 10 shows an example camera module according to one embodiment.

FIGS. 8 to 10 show an example HUD system 200 coupled to a pair of glasses according to another embodiment. The glasses and system 200 of FIGS. 8 to 10 are similar to the glasses and system 100 discussed above, and corresponding components thereof are labeled with corresponding reference characters of the form 2xx in place of 1xx.

Figure 8A:
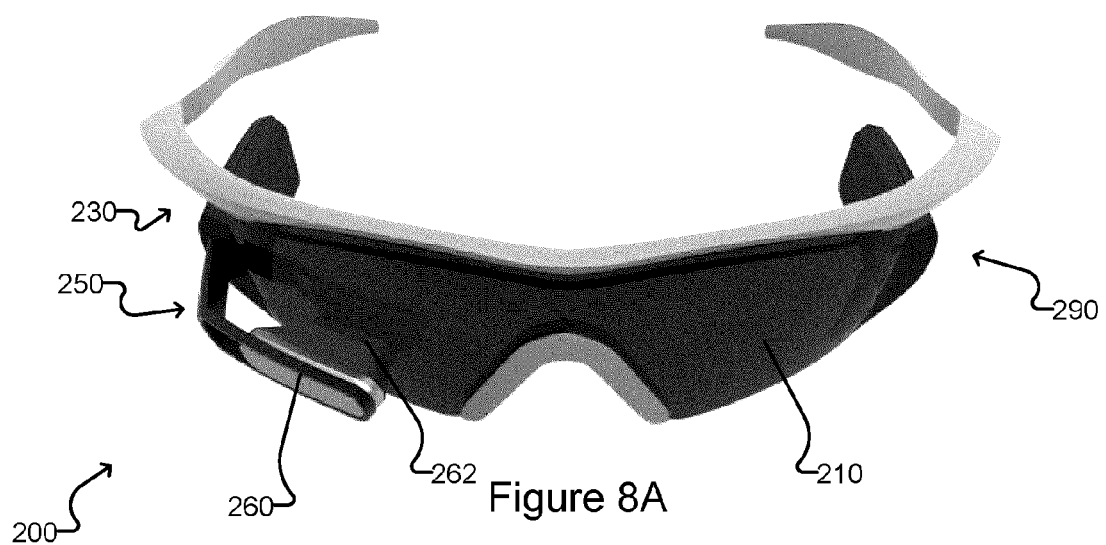
FIGS. 8A and 8B are other views of the glasses and HUD system of FIG. 8.
Figure 8B:
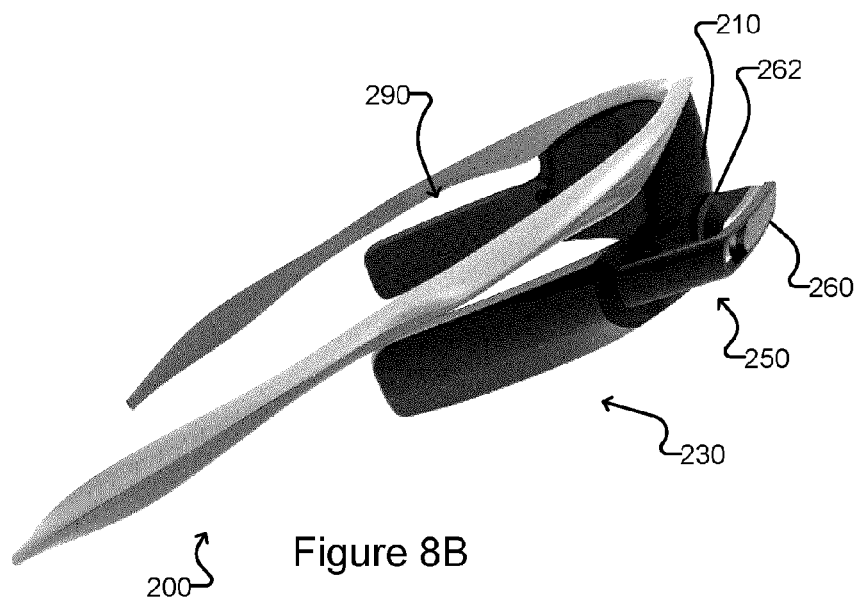

As best seen in FIGS. 8, 8A and 8B, display housing 260 comprises a viewing hood 262 extending rearward from display housing 260 which may be positioned against lens assembly 210. Viewing hood 262 reduces the amount of ambient light which could interfere with the user's viewing of images on the display. In some embodiments, display housing 260 and/or viewing hood 262 is constructed from an ultraviolet (UV)-blocking material, such as for example a UV-blocking plastic resin, as known in the art. Such embodiments may be particularly advantageous for use with lens assemblies having tinting or other properties which change with exposure to UV radiation (such as, for example, Transitions™ lenses or the like), such that the portion of the lens assembly between the display and the user's eye will not be affected UV exposure, resulting in better transmission and higher brightness/contrast quality of the image when viewed by the user.

FIG. 9 shows example structures for coupling power module 290 to lens assembly 210. It is to be understood that the same or similar structures may be provided on the other side of lens assembly 210 for coupling electronics module 230 (and thus display arm 250 and display housing 260) to lens assembly 210. A plurality of posts 215 (two in the illustrated embodiment) extend rearward from the left side of lens assembly 210, and power module 290 has a plurality of correspondingly shaped slots 295 for receiving posts 215.

FIG. 10 shows an example positioning of an optional camera 270 on display arm 250. In some embodiments, camera 270 may be provided as a modular unit which is connectable to a camera port on display arm 250 or electronics module 230.

FIGS. 11 to 12A show an example HUD system 300 coupled to a pair of glasses according to another embodiment, and FIGS. 13 to 14A show the electronics module 330, display arm 350 and display housing 360 of system 300 in isolation. System 300 of FIGS. 11 to 14A is similar to system 100 discussed above, and corresponding components thereof are labeled with corresponding reference characters of the form 3xx in place of 1xx. System 300 differs from system 100 in how the position of the display may be adjusted, but may be substantially the same as system 100 (or system 200 of FIGS. 8-10) in other respects. As such only the adjustability of the display of system 300 will be discussed in detail, but it is to be understood that system 300 may have any or all of the features of systems 100 and 200 as described above.

Display arm 350 of system 300 is adjustably coupled to electronics module 330 to facilitate adjustment of the position of display housing 360. A display unit 361 (which may, for example, include an LCD, backlight and magnifying lens, as well as optionally certain display driving circuitry) is adjustably received in display housing 360 as described below with reference to FIGS. 13 to 14A, and a viewing hood 362 extends rearward from display unit 361 for reducing the amount of ambient light which could interfere with the user's viewing of images on the display. In some embodiments, display housing 360 and/or viewing hood 362 is constructed from an ultraviolet (UV)-blocking material, such as for example a UV-blocking plastic resin, as known in the art. Such embodiments may be particularly advantageous for use with lens assemblies having tinting or other properties which change with exposure to UV radiation (such as, for example, Transitions™ lenses or the like), such that the portion of the lens assembly between the display and the user's eye will not be affected UV exposure, resulting in better transmission and higher brightness/contrast quality of the image when viewed by the user.

Display arm 350 is configured to bias display housing 360 toward lens assembly 310, such that viewing hood 362 is pressed against lens assembly 310. In some embodiments, display arm 350 is spring loaded such that when display arm 350 is pulled away from lens assembly 310 and released display arm 350 is urged back toward lens assembly 310. In some embodiments, display arm 350 is flexible and resilient and configured such that when display arm 350 is pulled away from lens assembly 310 and released display arm 350 is urged back toward lens assembly 310.

To adjust the position of display housing 360, a user pulls display housing 360 away from lens assembly 310, as indicated by arrow 353 in FIG. 11A. The user may then move display housing 360 down (as indicated by arrow 355D in FIG. 12) or up (as indicated by arrow 355U in FIG. 12A), then allow display housing 360 to move back toward lens assembly 310 such that hood 362 presses against lens assembly 310. Biasing provided by display arm 350 increases the friction between hood 362 and lens assembly 310 to hold display housing 360 in place.

Fine control over the display position is achieved by providing an adjustable connection between display housing 360 and display unit 361. In some embodiments, the connection between display housing 360 and display unit 361 is flexible and resilient such that the relative positions thereof may be adjusted by a user, and display unit 361 tends to return to a "default" or "rest" position with respect to display housing 360 when movement of display unit 361 is unconstrained (e.g., when the user releases display unit 361 and hood 362 is not pressed up against lens assembly 310). In some embodiments, the connection between display housing 360 and display unit 361 is malleable such that relative positions thereof may be adjusted by a user and the relative positions of display housing 360 and display unit 361 are maintained movement of display unit 361 is unconstrained (e.g., when the user releases display unit 361 and hood 362 is not pressed up against lens assembly 310).

FIGS. 13 and 13A illustrate lateral adjustability, and FIGS. 14 and 14A illustrate vertical adjustability, of display unit 361 with respect to display housing 360. To adjust the relative positions of display housing 360 and display unit 361, a user first pulls display housing 360 away from lens assembly 310 as described above. The user may then move display unit 361 right (as indicated by arrow 363R in FIG. 13), left (as indicated by arrow 363L in FIG. 13A), up (as indicated by arrow 363U in FIG. 14), down (as indicated by arrow 363D in FIG. 14A), or any combination thereof with respect to display housing 360. Once the desired position of display unit 361 is achieved, the user may allow display housing 360 to move back toward lens assembly 310 such that hood 362 presses against lens assembly 310. Biasing provided by display arm 350 increases the friction between hood 362 and lens assembly 310 to hold display unit 361 in the desired position.

Figure 15:
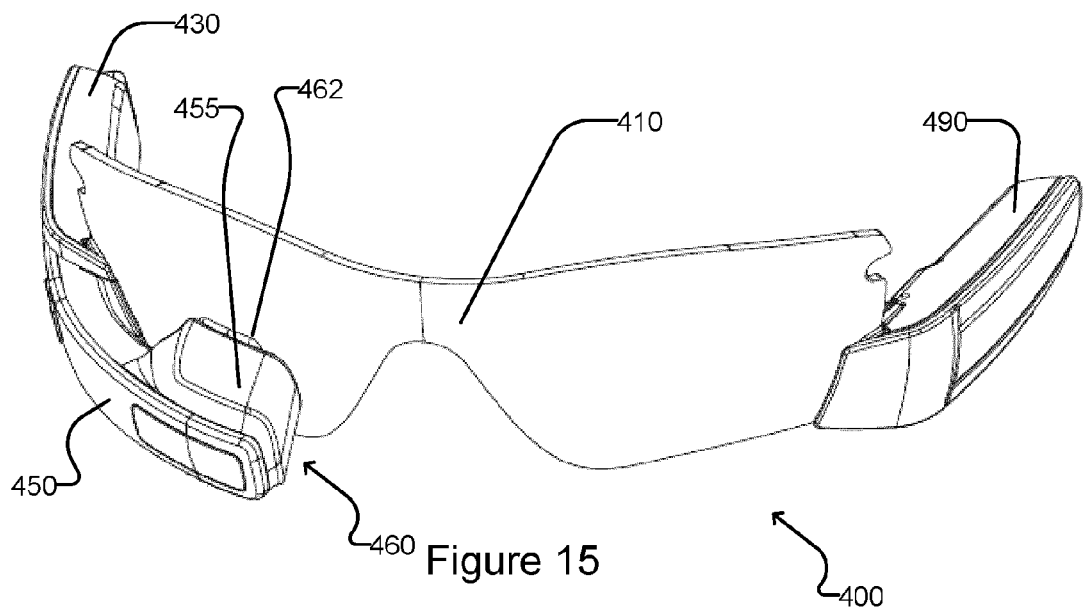
FIG. 15 shows an example glasses lens with a HUD system according to another embodiment.
Figure 15A:
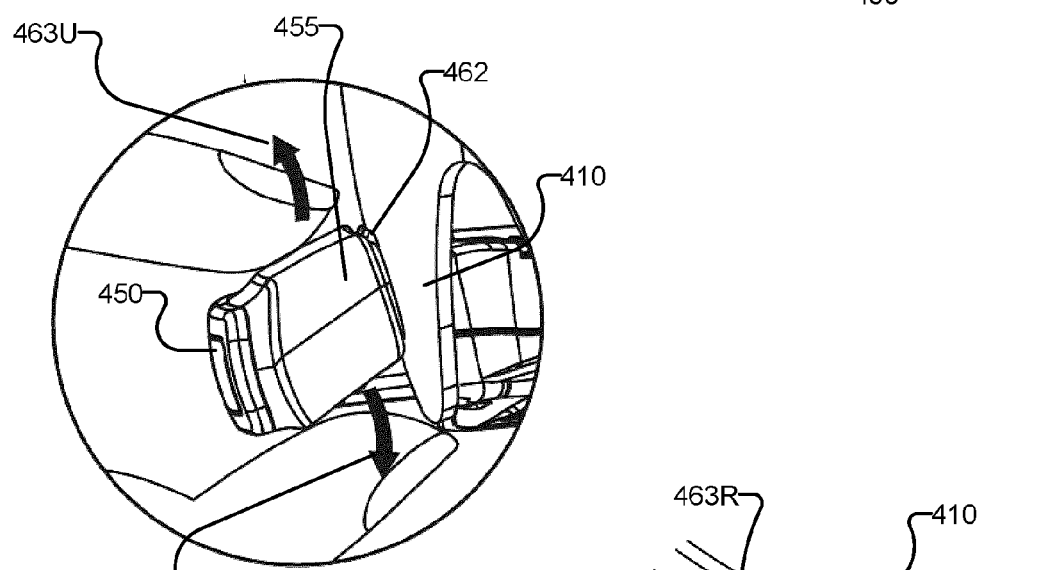
FIGS. 15A and 15B illustrate adjustability of the display unit of the HUD system of FIG. 15.
Figure 15B:
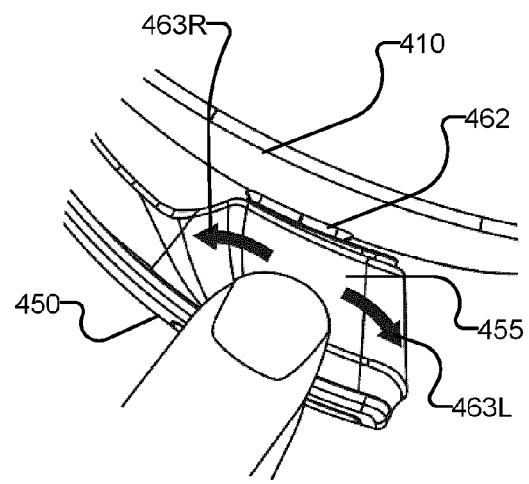

FIGS. 15 to 17C show an example HUD system 400 and glasses lens assembly 410 (sometimes referred to as "glasses lens" for convenience) according to another embodiment. Display arm 450 of HUD system 400 extends form electronics module 430 to position a display unit 460 within the user's field of view. Display arm 450 is substantially rigidly attached to electronics compartment 430. Display unit 460 is adjustably received in a display bracket 480 (see FIGS. 15D and 16A) attached near the end of display arm 450 as described further below. A flexible boot 455 made of rubber or some similar material covers the display unit 460 and display bracket 480, such that the user may adjust the viewing angle of the display as shown in FIGS. 15A and 15B. In particular, the user can adjust the pitch of the display unit 460 through the boot 455 by moving the boot 455 up and down as indicated by arrows 463U and 463D as shown in FIG. 15A. The user can adjust the yaw of the display unit 460 through the boot 455 by moving the boot 455 left and right as indicated by arrows 463L and 463R as shown in FIG. 15B. A display hood 462 extends from the boot 455 toward the glasses lens 410. Hood 462 may be collapsible to conform to the shape of glasses lens 410. Hood 462 may, for example, be constructed from the same material as boot 455, and may be integrally formed with hood 462.

Figure 15C:
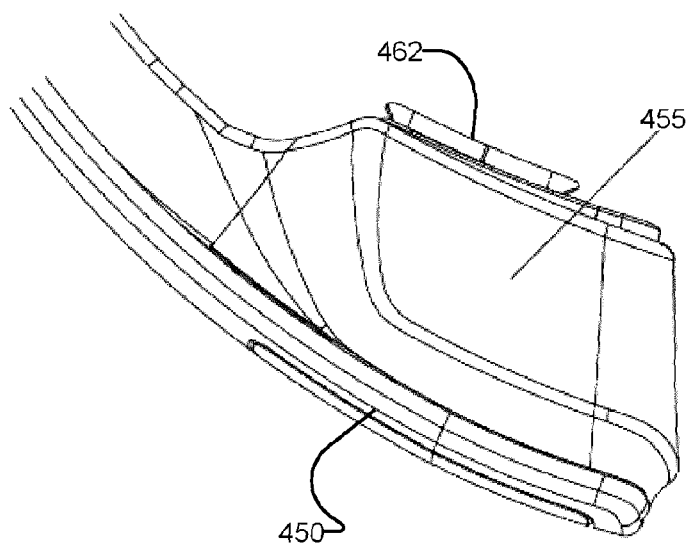
FIG. 15C shows the end of the display arm of the HUD system of FIG. 15 in isolation.
Figure 15D:
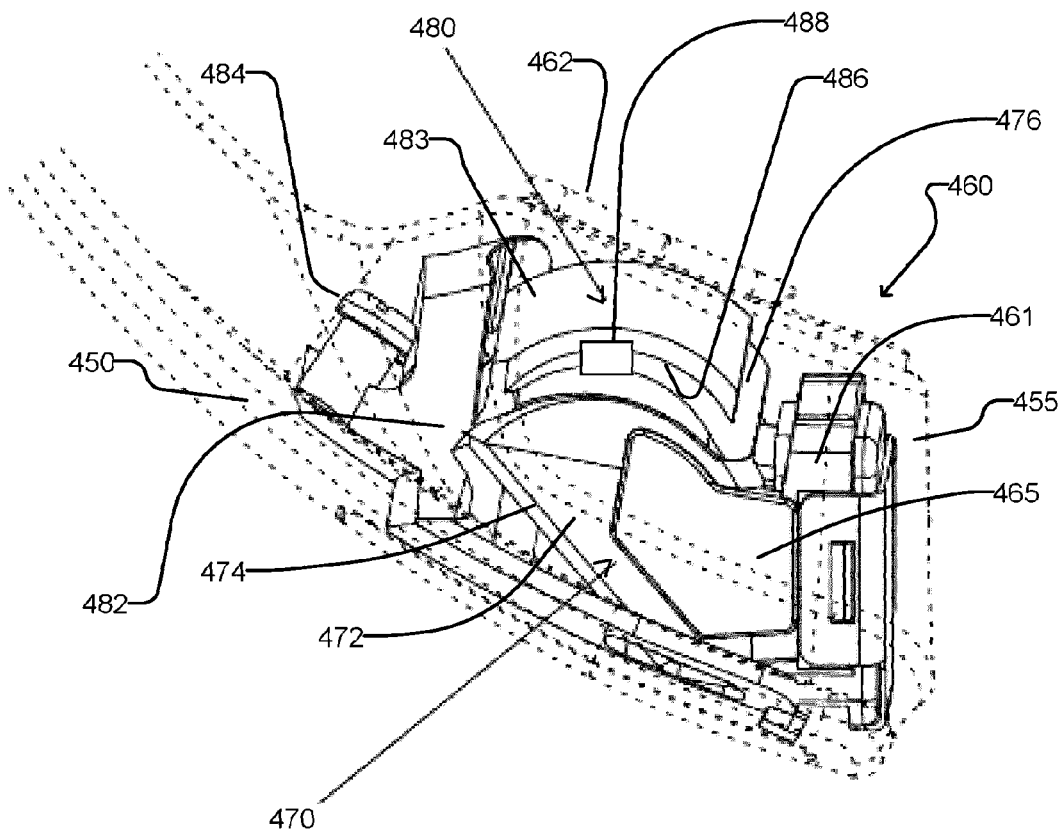
FIG. 15D shows internal components of the end of the display arm of the HUD system of FIG. 15.

FIGS. 15C and 15D show the end portion of display arm 450 in isolation. In FIG. 15D, display arm 450, boot 455 and hood 462 are depicted transparently with broken lines to illustrate an example configuration of the internal components in the end portion of display arm 450. The example internal components are also shown in FIG. 16A, which is a sectional view taken along line A-A of FIG. 16.

Figure 16:
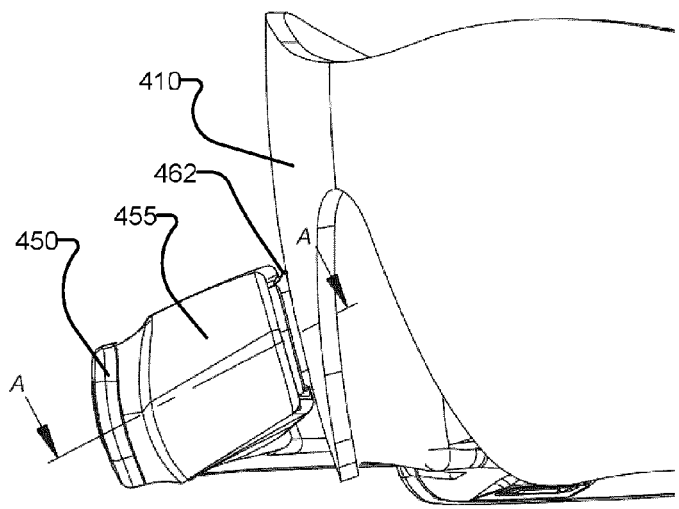
FIG. 16 is a side view of the glasses lens and the end of the display arm of the HUD system of FIG. 15.
Figure 16A:
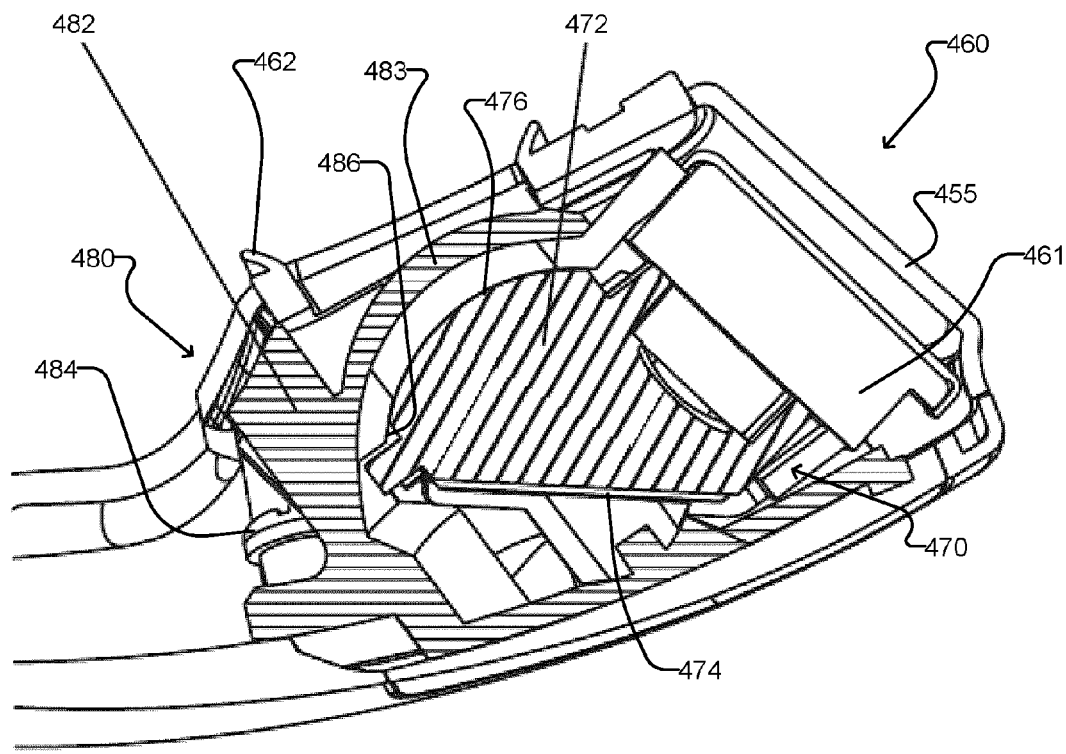
FIG. 16A is a sectional view taken along line A-A of FIG. 16.

As best seen in FIGS. 15D and 16A, display unit 460 comprises a display an backlight assembly 461 and an optical assembly 470 which are held in fixed relation to each other by connecting features 465. Optical assembly 470 comprises a display lens 472 and a reflective surface 474 configured to direct light from display and backlight assembly 461 through hood 462 and toward the user's eye. Display lens 472 has a convex spherical surface 474 sized and shaped to mate with a concave spherical surface 486 of display bracket 480, as described below.

Display bracket 480 comprises a body 482 attached to display arm 450, for example by a fastener such as a screw 484. An extension 483 from body 482 defines the concave spherical surface 486 that receives the convex spherical surface 474 of display lens 472. Concave spherical surface 486 has an opening therethrough for allowing light to pass from the optical assembly 470 through to the user's eye. The opening through concave spherical surface 486 of bracket 480 may be generally rectangular in some embodiments. The extension 483 may comprise one or more stops 488 extending around the edge of concave spherical surface 486 to limit the range of movement of optical assembly 470.

Figure 17:
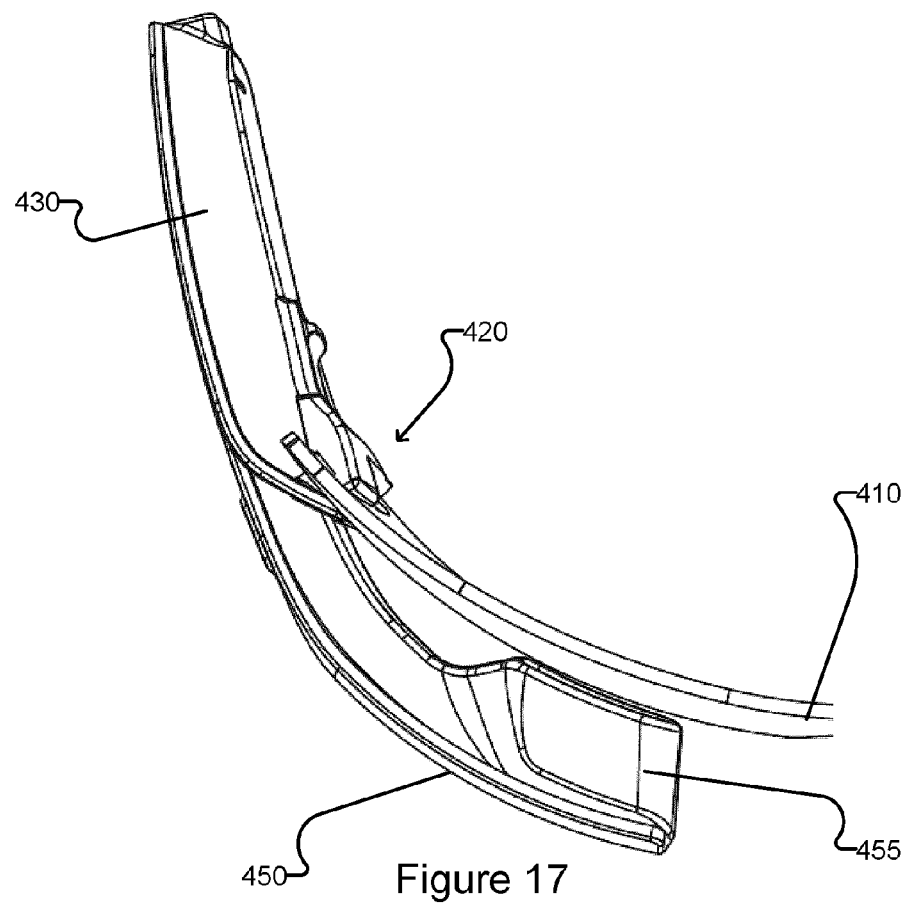
FIG. 17 is a top view of a portion of the glasses lens and HUD system of FIG. 15, showing an example module connector for connecting the electronics module to the glasses lens.
Figure 17A:
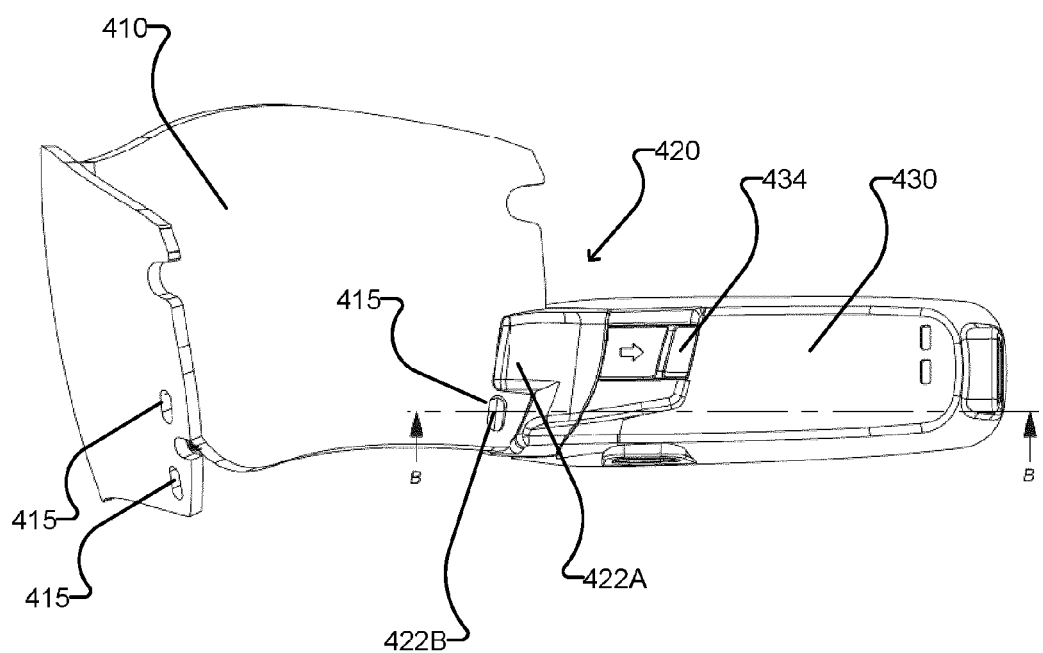
FIG. 17A is an inner side view of the glasses lens, electronics module and module connector of FIG. 17.
Figure 17B:
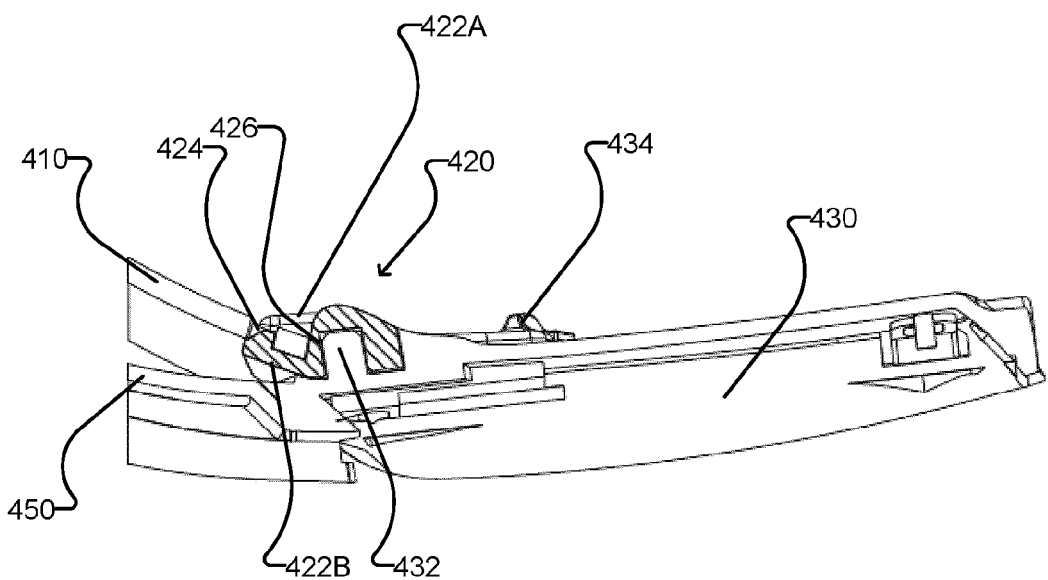
FIG. 17B is a sectional view taken along line B-B of FIG. 17A.
Figure 17C:
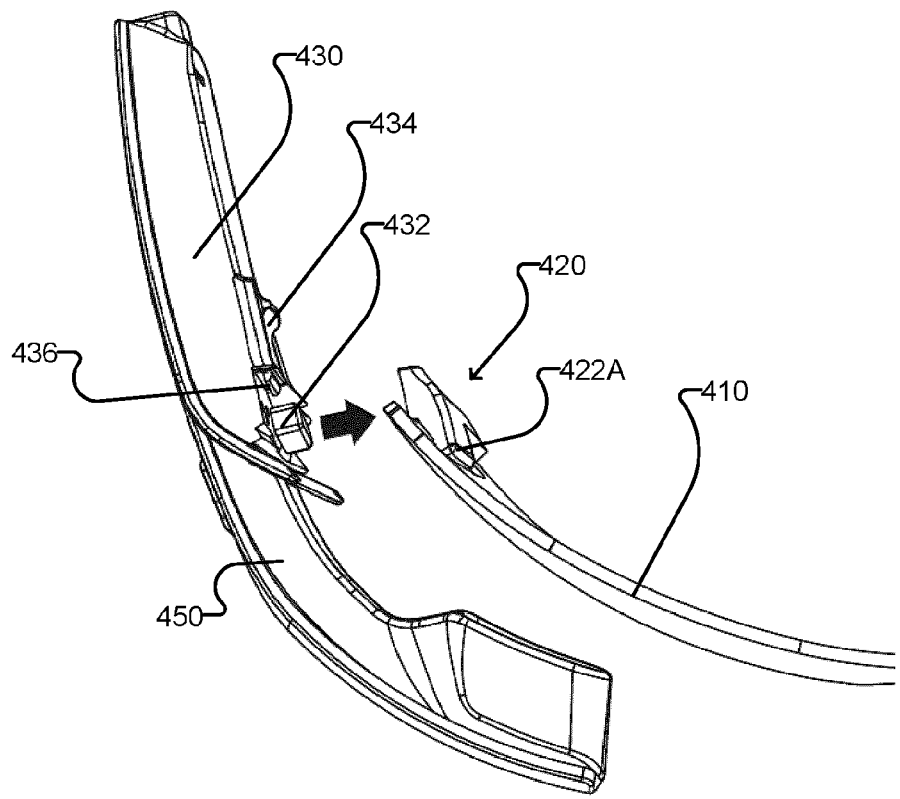
FIG. 17C is a top view of the glasses lens, electronics module and module connector of FIG. 17 illustrating attachment of the electronics module to the module connector.

FIGS. 17 to 17C show an example module connector 420 for connecting electronics module to one side of glasses lens assembly 410 according to one embodiment. Power module 490 may be attached to the other side of glasses lens 410 by another module connector (not shown), which may be a mirror image of module connector 420. Glasses lens 410 may provide a conductive path between the first and second sides as described above. In some embodiments, the electrical connections between electronics module 430 and power module 490 and the conductive path(s) glasses lens 410 are effected directly (e.g. through contacts in electronics module 430 and power module 490 that are in contact with the conductive path(s)). In some embodiments, the electrical connections between electronics module 430 and power module 490 and the conductive path(s) glasses lens 410 are effected through conducting portions formed in the module connectors.

As best seen in FIGS. 17A and 17B, module connector 420 comprises two protrusions 422A and 422B configured to engage holes 415 in the side portion of glasses lens 410. In the illustrated example, protrusion 422A is configured to be positioned on the inner face of glasses lens 410 and has an outwardly extending tab 424 to engage an upper one of the holes 415, and protrusion 422B is configured to be positioned on the outer face of glasses lens 410 and has an inwardly extending tab 424 to engage an lower one of the holes 415. The holes 415 may extend all the way through glasses lens 410 as in the illustrated example embodiment, or may only extend part way into glasses lens 410 in other embodiments. Module connector 420 may be attached to glasses lens 410 by pressing protrusions 422A and 422B onto the edge of glasses lens 410 such that the tabs 424 engage the holes 415. Tabs 424 are preferably shaped to facilitate attachment of module connector 420 to glasses lens 410 and inhibit removal of module connector 420 from glasses lens 410.

Module connector 420 has a recess 426 on the outer face thereof configured to receive a post 432 on the inner face of electronics module 430. Electronics module 430 also comprises a spring loaded latch 434 on the inner face thereof. Latch 434 is moveable into and out of engagement with module connector 420, and is biased into engagement with module connector 420. A tab 436 on latch 434 is configured to be received in a corresponding slot (not shown) in module connector 420.

As shown in FIG. 17C, a user may couple electronics module 430 to glasses lens 410 simply by pressing electronics module 430 inwardly onto module connector 420 as indicated by the arrow in FIG. 17C. Tab 436 is shaped to move latch 434 backwards as post 432 is inserted into recess 426. A user may remove electronics module 430 from glasses lens 410 by pulling latch 434 backwards and pulling electronics module 430 away from module connector 420.

Figure 18:
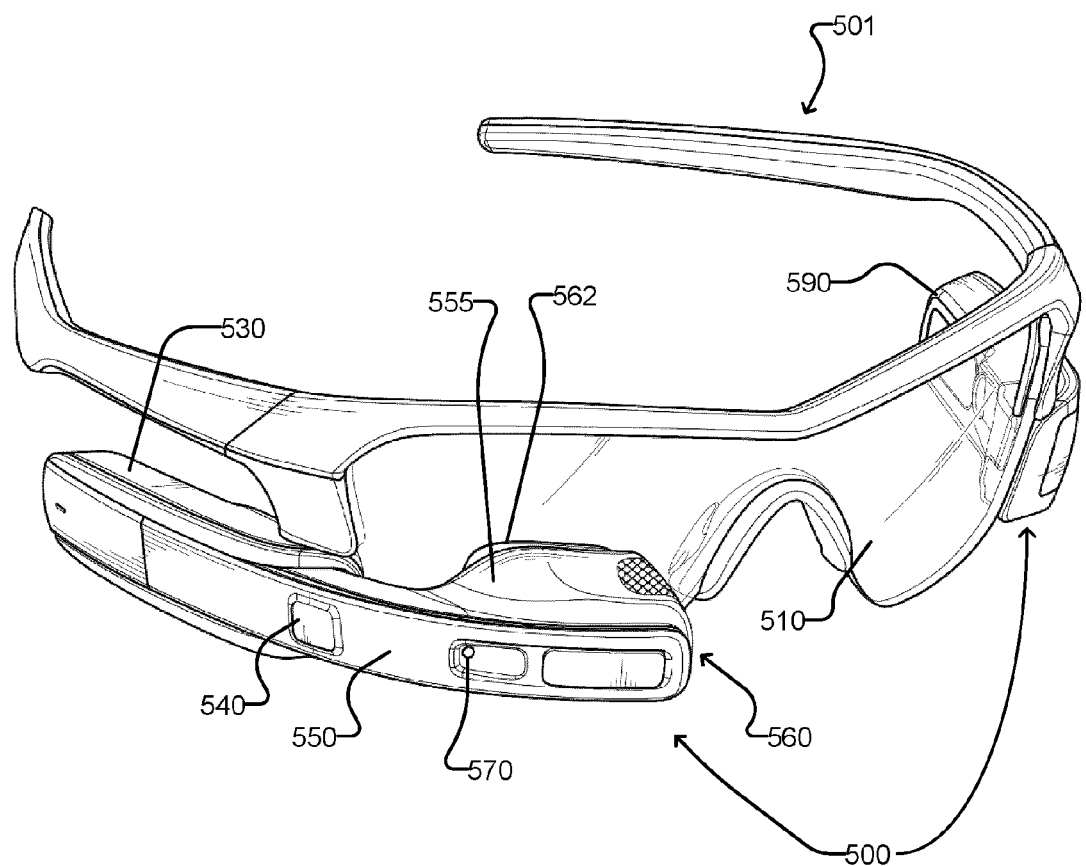
FIG. 18 shows an example pair of glasses with a HUD system mounted on the glasses lens according to another embodiment.

FIG. 18 shows an example HUD system 500 mounted to a glasses lens assembly 510 (sometimes referred to as "glasses lens" for convenience) of a pair of glasses 501 according to another embodiment. HUD system 500 of FIG. 18 is substantially similar to HUD system 400 of FIGS. 15 to 17C, and corresponding components thereof are labeled with corresponding reference characters of the form 5xx in place of 4xx. HUD system 500 of FIG. 18 includes a user interface component 540 on the display arm 550. The user interface component 540 may, for example, comprise an optical finger mouse. HUD system 500 of FIG. 18 also includes a camera 570 mounted on the display arm 550.

As will be apparent to one of skill in the art from the present disclosure, the features and components of systems 100, 200, 300, 400, and 500 may be combined with each other in different permuations and subcombinations from those of the example described above. For example, the user interface, camera, microphone and speaker described above in relation to system 100 may be incorporated into any of systems 200, 300, 400, or 500. In other examples, the arm adjustability of system 100, 200 and/or 300 may be combined with the display unit adjustability of system 400 or 500, and/or the module connectors of system 400 or 500 may be used in any of systems 100, 200 and/or 300.

Other embodiments may provide HUD systems with variations of the features described above and/or different features from those described above. Such variations and/or different features may be used in the alternative to or in addition to the features described above, or with each other in different combinations and permutations than the example embodiments discussed herein.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto. Although example embodiments have been described herein with the reference to the accompanying drawings, it is to be understood that the invention is not limited to those exact constructions and operations, and that various other changes and modifications may be made by one skilled in the art.

Embodiments of the invention may be implemented using specifically designed hardware, configurable hardware, programmable data processors configured by the provision of software (which may optionally comprise 'firmware') capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs") and the like. Examples of configurable hardware are: one or more programmable logic devices such as programmable array logic ("PALs"), programmable logic arrays ("PLAs") and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

In some embodiments, aspects of the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Software and other modules may reside on servers, workstations, personal computers, tablet computers, data encoders, data decoders, PDAs, mobile phones, media players, and other devices suitable for the purposes described herein. Those skilled in the relevant art will appreciate that aspects of the system can be practiced with any suitable communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics (e.g., video projectors, audio-visual receivers, displays, such as televisions, and the like), network PCs, mini-computers, mainframe computers, and the like.

Where a component (e.g. a software module, processor, controller, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or steps with equivalent features, elements and/or steps; mixing and matching of features, elements and/or steps from different embodiments; combining features, elements and/or steps from embodiments as described herein with features, elements and/or steps of other technology; and/or omitting features, elements and/or steps from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A Heads-Up Display (HUD) system for a pair of glasses comprising:
   a glasses lens assembly having a first side and a second side opposite the first side;
   a power module mounted to the first side of the glasses lens assembly;
   an electronics module mounted to the second side of the glasses lens assembly; and
   a display for displaying images under control of the electronics module, the display mounted on a display arm extending from the electronics module to a position within a field of vision of a user wearing the glasses;
   wherein the display is part of a display unit comprising the display and an optical assembly, and the display unit is adjustably received in a display bracket attached to an end portion of the display arm; and
   wherein the HUD comprises a flexible boot attached to the end portion of the display arm for covering the display bracket and the display unit; wherein the flexible boot comprises an opening facing the glasses lens assembly.

2. The system of claim 1 wherein the display arm is adjustable in one or more degrees of freedom to facilitate adjustment of the position of the display.

3. The system of claim 1 wherein the glasses lens assembly provides one or more electrically conductive paths from the first side to the second side thereof.

4. The system of claim 3 wherein the glasses lens assembly comprises a transparent lens having transparent conductive films on front and rear faces thereof.

5. The system of claim 3 wherein the glasses lens assembly comprises a transparent lens having a flexible printed circuit cable extending from the first side to the second side.

6. The system of claim 1 wherein the display is housed in a display housing constructed from an ultraviolet-blocking material.

7. The system of claim 1 wherein the display arm comprises one or more joints therein for adjusting the position of the display.

8. The system of claim 1 wherein the display arm is configured to bias the display toward the glasses lens assembly.

9. The system of claim 1 wherein the display is part of a display unit coupled to a display housing attached to an end portion of the display arm.

10. The system of claim 9 wherein the display unit is adjustably coupled to the display housing.

11. The system of claim 1 wherein the optical assembly comprises a display lens having a convex spherical surface and the display bracket comprises a concave spherical surface sized and shaped to mate with the convex spherical surface of the display lens.

12. The system of claim 11 wherein the display bracket comprises one or more stops around a periphery thereof for limiting movement of the optical assembly.

13. The system of claim 11 wherein the optical assembly comprises a reflective surface for redirecting light from the display toward the convex spherical surface.

14. The system of claim 1, comprising a display hood disposed about the opening of the flexible boot, the display hood configured to abut the glasses lens assembly.

15. The system of claim 1 comprising first and second module connectors attached to the first and second sides of the glasses lens assembly, wherein the power module is releasably attachable to the first module connector and the electronics module is releasably attachable to the second module connector.

16. The system of claim 15 wherein the glasses lens assembly has one or more holes on each of the first and second sides thereof, and the first and second module connectors comprise one or more protrusions configured to engage the one or more holes.

17. The system of claim 15 wherein the glasses lens assembly has two holes or recesses on each of the first and second sides thereof, and each of the first and second module connectors comprises an outer projection with an inwardly facing tab configured to engage one of the two holes or recesses from the outer face of the glasses lens assembly and an inner projection with an outwardly facing tab configured to engage the other one of the two holes or recesses from the inner face of the glasses lens assembly.

18. The system of claim 15 wherein each of the first and second module connectors comprises a recess on an outer face thereof, and wherein the power module and the electronics module each comprise an inwardly extending post configured to be received in the recess.

19. The system of claim 15 wherein the power module and the electronics module each comprise a spring loaded latch on an inner face thereof, the latch moveable into and out of engagement with the module connector and biased toward engagement with the module connector.

20. A Heads-Up Display (HUD) system for mounting on a pair of glasses, the HUD system comprising:

a power module for providing electrical power removably mountable to one side of a lens assembly of the glasses; and an electronics module connectable to receive electrical power from the power module, the electronics module removably mountable to an opposite side of the lens assembly of the glasses; and a display mounted on a display arm extending from the electronics module to a position within a field of vision of a user wearing the glasses;

wherein the display is part of a display unit comprising the display and an optical assembly, and the display unit is adjustably received in a display bracket attached to an end portion of the display arm; and wherein the HUD comprises a flexible boot attached to the end portion of the display arm for covering the display bracket and the display unit, the flexible boot having an opening facing the glasses lens assembly.

21. A pair of glasses adapted to receive a Heads-Up Display (HUD) system, the glasses comprising a lens assembly providing one or more electrically conductive paths from a first side thereof to a second side thereof;

wherein the HUD comprises:

a power module for providing electrical power removably mountable to one side of a lens assembly of the glasses; and an electronics module connectable to receive electrical power from the power module, the electronics module removably mountable to an opposite side of the lens assembly of the glasses; and a display mounted on a display arm extending from the electronics module to a position within a field of vision of a user wearing the glasses;

wherein the display is part of a display unit comprising the display and an optical assembly, and the display unit is adjustably received in a display bracket attached to an end portion of the display arm; and wherein the HUD comprises a flexible boot attached to the end portion of the display arm for covering the display bracket and the display unit, the flexible boot having an opening facing the glasses lens assembly.

\* \* \* \* \*